(12) United States Patent
Montgomery

(10) Patent No.: US 7,755,211 B2
(45) Date of Patent: Jul. 13, 2010

(54) RIGID STRUCTURAL ARRAY

(76) Inventor: James Scott Montgomery, 4052 Gros Ventre Ave., San Diego, CA (US) 92117

( * ) Notice: Subject to any disclaimer, the term of this patent is extended or adjusted under 35 U.S.C. 154(b) by 218 days.

(21) Appl. No.: 12/057,250

(22) Filed: Mar. 27, 2008

(65) Prior Publication Data
US 2008/0238103 A1 Oct. 2, 2008

Related U.S. Application Data

(63) Continuation-in-part of application No. 11/764,798, filed on Jun. 18, 2008, now Pat. No. 7,535,117.

(51) Int. Cl.
F03B 13/10 (2006.01)
(52) U.S. Cl. .......................... 290/53; 290/42
(58) Field of Classification Search .................. 290/53
See application file for complete search history.

(56) References Cited

U.S. PATENT DOCUMENTS

| 3,697,764 | A | * | 10/1972 | Stanziola et al. | 290/42 |
|---|---|---|---|---|---|
| 3,783,302 | A | * | 1/1974 | Woodbridge | 290/42 |
| 3,988,592 | A | | 10/1976 | Porter | |
| 4,145,885 | A | * | 3/1979 | Solell | 60/504 |
| 4,184,335 | A | * | 1/1980 | Byrne | 60/496 |
| 4,208,878 | A | * | 6/1980 | Rainey | 60/496 |
| 4,260,901 | A | * | 4/1981 | Woodbridge | 290/42 |
| 4,326,840 | A | | 4/1982 | Hicks | |
| 4,355,511 | A | * | 10/1982 | Jones | 60/507 |
| 4,622,473 | A | * | 11/1986 | Curry | 290/53 |
| 4,754,157 | A | | 6/1988 | Windle | |
| 4,773,221 | A | | 9/1988 | Noren | |
| 4,883,411 | A | | 11/1989 | Windle | |
| 5,411,377 | A | * | 5/1995 | Houser et al. | 417/333 |
| 5,435,134 | A | | 7/1995 | Nielsen | |
| 6,052,334 | A | | 4/2000 | Brumley | |
| 6,208,035 | B1 | * | 3/2001 | Kao | 290/42 |
| 6,226,989 | B1 | | 5/2001 | Fredriksson | |
| 6,291,904 | B1 | | 9/2001 | Carroll | |
| 6,731,019 | B2 | | 5/2004 | Burns | |
| 6,768,216 | B1 | | 7/2004 | Carroll | |
| 6,791,205 | B2 | | 9/2004 | Woodbridge | |
| 6,791,206 | B1 | * | 9/2004 | Woodbridge | 290/53 |
| 6,935,810 | B2 | * | 8/2005 | Horton, III | 405/200 |
| 7,033,623 | B2 | | 4/2006 | Suzuki et al. | |
| 7,140,180 | B2 | | 11/2006 | Gerber | |
| 7,199,481 | B2 | * | 4/2007 | Hirsch | 290/42 |
| 7,281,881 | B1 | * | 10/2007 | Cermelli et al. | 405/203 |
| 7,298,054 | B2 | * | 11/2007 | Hirsch | 290/42 |
| 7,323,790 | B2 | | 1/2008 | Taylor | |
| 7,362,003 | B2 | | 4/2008 | Stewart | |
| 7,385,301 | B2 | * | 6/2008 | Hirsch | 290/42 |

(Continued)

FOREIGN PATENT DOCUMENTS

GB 2388873 A * 11/2003

(Continued)

Primary Examiner—Joseph Waks
(74) Attorney, Agent, or Firm—Spencer Fane Britt & Browne LLC

(57) ABSTRACT

A device for maintaining a plurality of ocean wave energy converters at a predetermined proximity. The device includes at least one deck having a plurality openings, each adapted to receive a portion of an ocean wave energy converter.

27 Claims, 15 Drawing Sheets

U.S. PATENT DOCUMENTS

| | | | |
|---|---|---|---|
| 7,585,131 B2 * | 9/2009 | Oigarden et al. | 405/76 |
| 7,629,703 B2 * | 12/2009 | Storbekk | 290/53 |
| 2002/0157398 A1 * | 10/2002 | Boyd | 60/721 |
| 2005/0236840 A1 * | 10/2005 | Stark et al. | 290/53 |
| 2007/0228736 A1 * | 10/2007 | Smushkovich | 290/42 |
| 2007/0228737 A1 | 10/2007 | Hirsch | |
| 2007/0266704 A1 | 11/2007 | Bull | |
| 2007/0286683 A1 * | 12/2007 | Bull et al. | 405/195.1 |
| 2008/0012344 A1 | 1/2008 | Buffard | |
| 2008/0088133 A1 | 4/2008 | Nagata | |
| 2008/0284173 A1 * | 11/2008 | Stansby et al. | 290/53 |
| 2009/0008941 A1 * | 1/2009 | Irti | 290/53 |
| 2009/0196693 A1 * | 8/2009 | Kelly et al. | 405/195.1 |

FOREIGN PATENT DOCUMENTS

| | | |
|---|---|---|
| JP | 56157683 | 12/1981 |

* cited by examiner

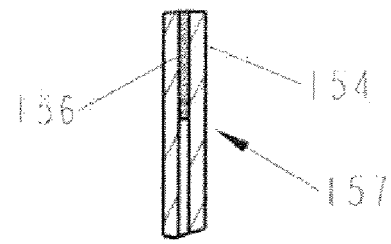
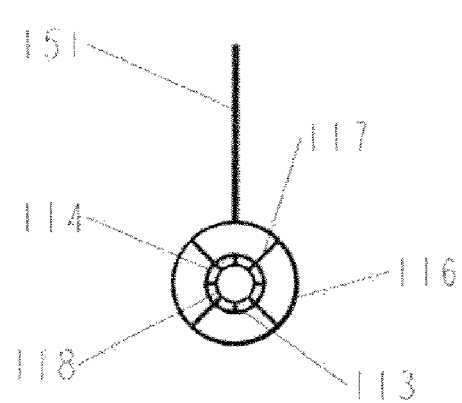
FIG. 14
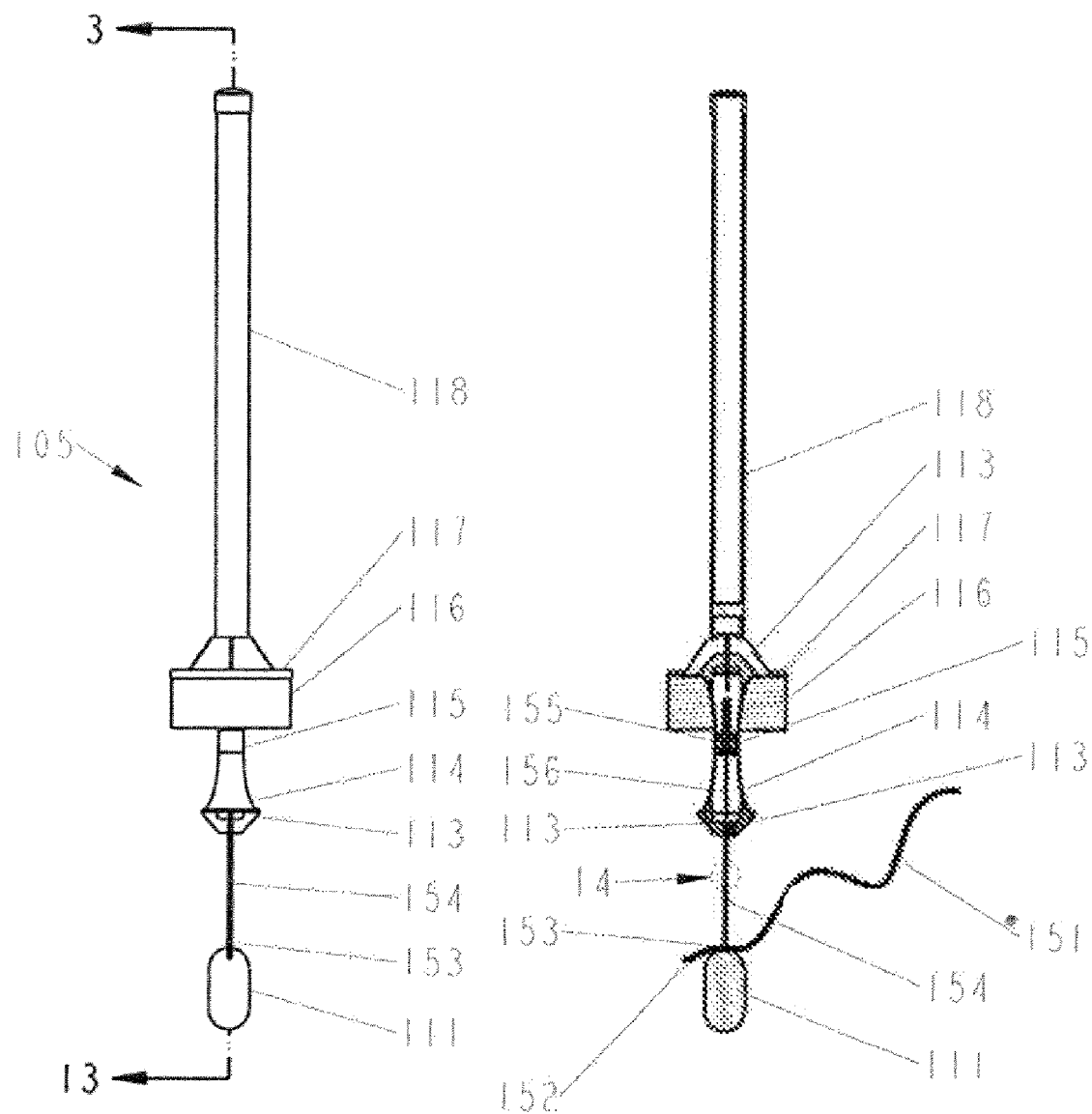
FIG. 12    FIG. 13

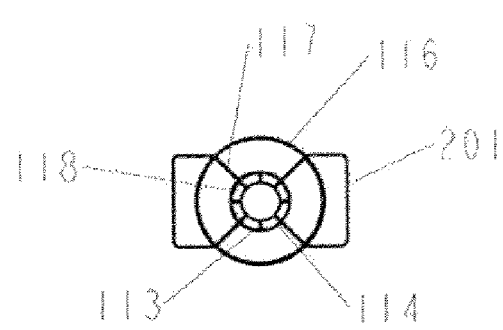
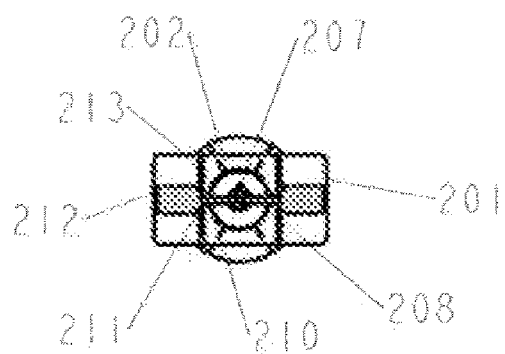
FIG. 21
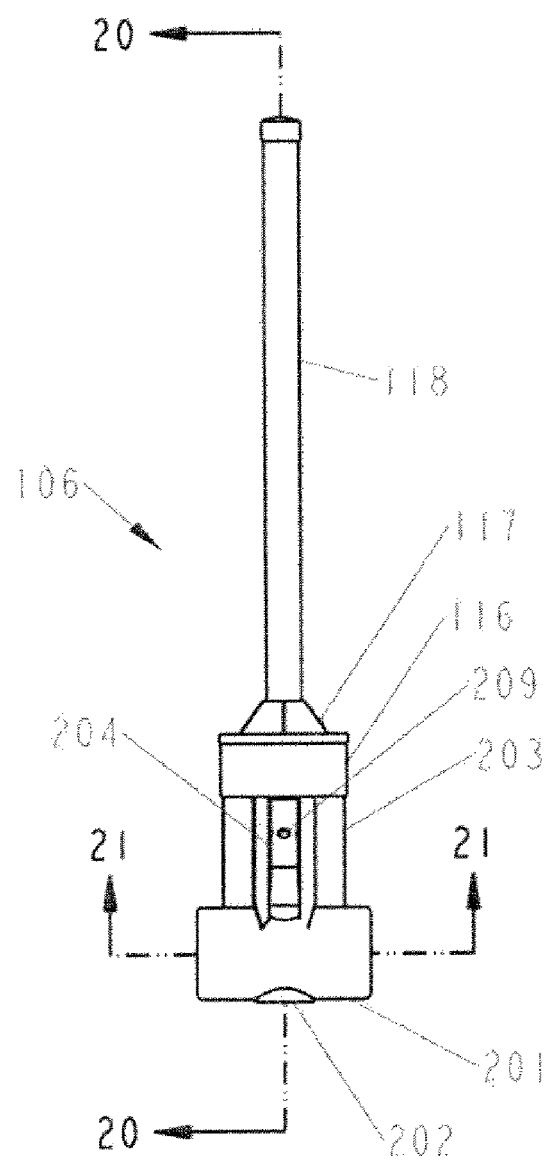
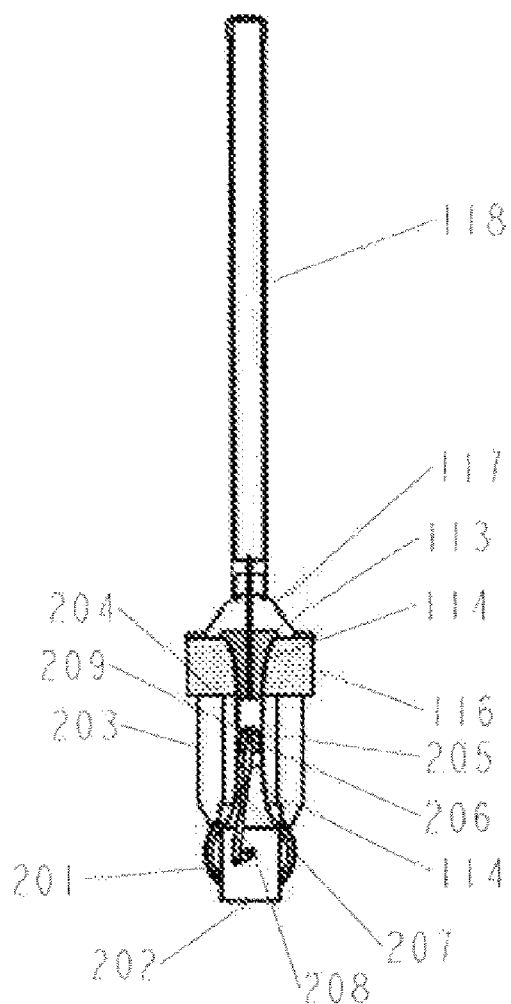
FIG. 19  FIG. 20

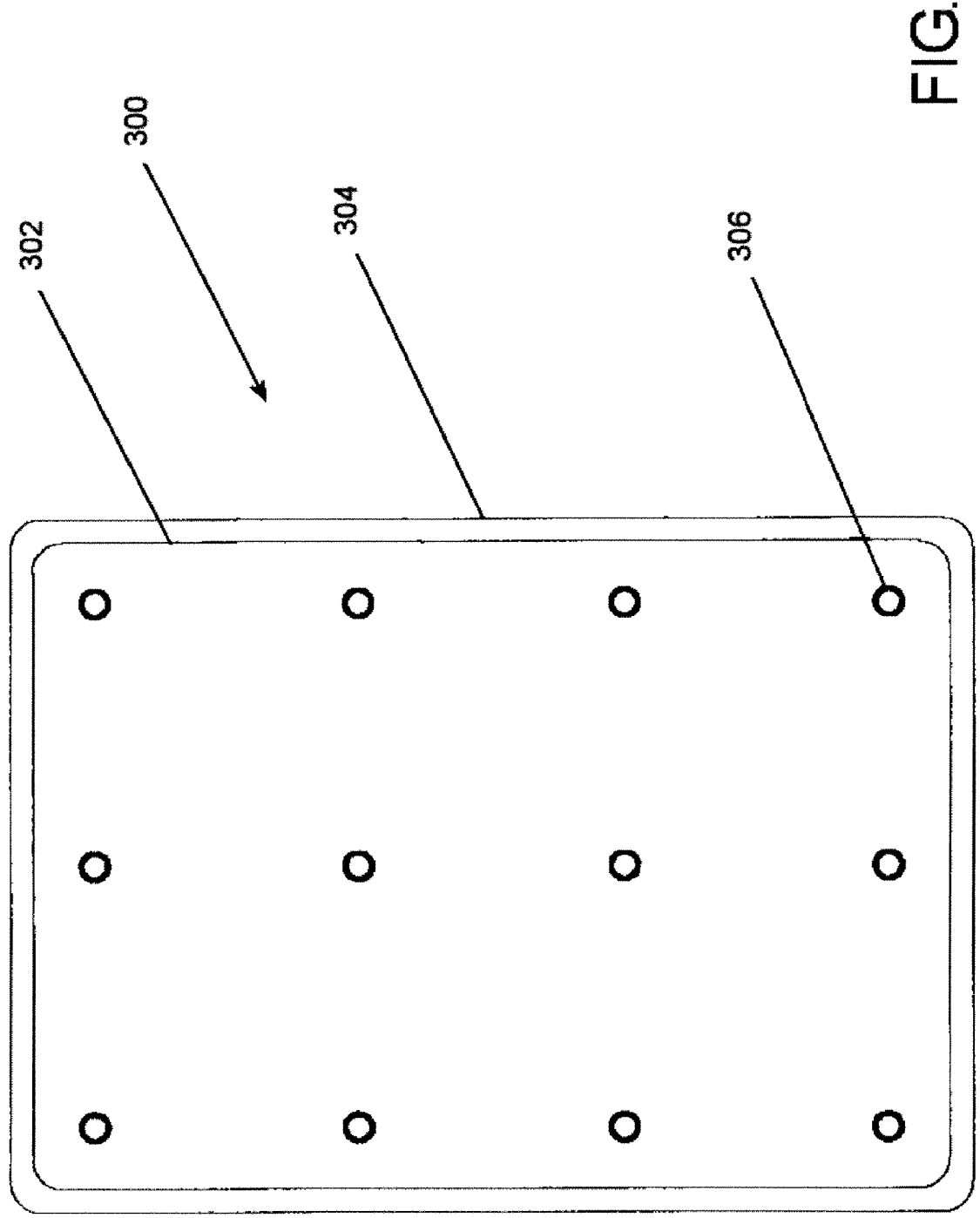

RIGID STRUCTURAL ARRAY

RELATED APPLICATIONS

This application is a Continuation-In-Part of U.S. patent application Ser. No. 11/764,798, filed on Jun. 18, 2007, which Application in turned claimed benefit of U.S. Provisional Patent Application 60/814,179, filed on Jun. 17, 2006. Both of these previous Applications are hereby incorporated by reference herein in their entirety.

BACKGROUND OF THE INVENTION

1. Field of the Invention

The present invention relates generally to a device for producing power and potable water, and more specifically to a device for harnessing ocean wave energy for producing power and potable water.

2. Description of the Prior Art

As societies become more complex and populations grow, the demand for energy is ever-increasing. In modern societies, energy production relies in large part on non-renewable resources such as coal, oil, and natural gas. In addition to existing in finite supply, use of these products leads to formation of pollutants that raise environmental concerns. Burning coal and oil products, for example, leads to airborne pollutants including carbon dioxide. Natural gas, which is often thought to be largely pollutant-free, requires processing prior to use, and this processing produces airborne pollutants as byproducts. Further, the transport of oil and other petroleum products carries within it an inherent risk of pollution due to, for example, a leak in a transport vessel.

Alternate forms of energy production are proposed from time to time, each having various benefits and detriments. Biofuel or biomass energy sources, for example, are often proposed as solutions to the world's energy problems, in part because they represent largely renewable resources. Such fuels suffer from problems, however, in that they produce pollutants in many cases similar to that produced by the use of fossil fuels, and production of sufficient biomass to meet the world's energy demands seems unlikely and can, in some instances, compete directly with resources needed for the world's food supply.

Hydroelectric energy is common in the form of hydroelectric dams, where water from, for example, a river is used to turn turbines or water wheels that are coupled to electrical generators. Such methods, however, may have a considerable environmental impact on the area surrounding the dam, and particularly with respect to the area downstream from the dam.

Nuclear energy holds promise in that the amount of energy produced from a small amount of material is great, and in that there is little or not air pollution produced by a nuclear power plant. Nuclear energy also has certain drawbacks, however, in that dangerous waste is produced and must be disposed of. In addition, uranium mining results in the release of greenhouse gases that lead to environmental concerns.

Wind power is another method that produces no air pollution and is therefore an attractive source of energy production. Such a method, however, is less than desirable in areas where there is no constant source of wind. Furthermore, wind power units are seen as eyesores by many living in areas in which they have been implemented, and the devices have been known to affect bird migratory patterns and to present physical dangers to bird flying near them.

Wave power, on the other hand, is widely available to areas having abundant coastlines, and use of wave power can have a minimal environmental effect. Further, wave power is largely renewable and, as opposed to wind or solar power, is predictable.

Wave engine devices have been described in patent documents related to the present document and referenced above. Such devices are successful in producing electrical power, but in some cases it may be desirable to combine the output of two or more such wave engine devices (also referred to herein as ocean wave energy converters, or OWECs). Such a combination may be accomplished by simply providing two or more OWECs free-floating in close proximity to one another, with the appropriate electrical cabling between them to combine the output of both. This is not desirable, however, in that free-floating OWECs may be drawn apart by the action of the body of water in which they are positioned, placing strain on the connecting cables joining them. Even when moored to the ocean floor, there will be a tendency for the devices to drift apart, and as multiple OWEC devices are placed in proximity to one another the problem is exacerbated, and the devices may tend to come into contact with one another, thereby doing damage to the devices.

What is needed, therefore, is a structural device for allowing the placement of multiple OWEC in close proximity to one another, attenuating the drift of the devices and the likelihood of collisions between one or more device. What is further needed is such a structural device adapted for housing power or water production facilities and further adapted to provide for easy maintenance of the OWECs used therewith.

SUMMARY OF THE INVENTION

The present invention is directed to a device for maintaining a plurality of ocean wave energy converters at a predetermined proximity. The device includes at least one deck having a plurality of openings, each adapted to receive a portion of an ocean wave energy converter.

In another implementation of the present invention, upper and lower decks are provided, each having openings adapted to receive first and second portions of ocean wave energy converters, respectively.

In still another implementation of the present invention, lower or submerged decks associated with the present device have a porous structure.

In another implementation of the present invention, openings in a lower deck of the present device are adapted to receive ocean wave energy converters therethrough such that ocean wave energy converters can be removed from a body of water and placed on the lower deck for maintenance.

In another implementation of the present device, an upper deck thereof is provided with a power plant and/or a desalination plant for producing electricity and potable water from the action of ocean wave energy converters associated therewith.

BRIEF DESCRIPTION OF THE DRAWING FIGURES

FIG. 12 is a side elevation view of an implementation of a wave engine adapted for use with a linear pump and having a top elevation view of the same included therewith.

FIG. 13 is a sectional view of the implementation of a wave engine device shown in FIG. 12.

FIG. 14 is a detail view of the implementation of a wave engine device shown in FIG. 13.

FIG. 19 is a side elevation view of an implementation of a wave engine device adapted for use with slider crank and having a top elevation view of the same included therewith.

FIG. 20 is a sectional view of the implementation of a wave engine device shown in FIG. 19.

FIG. 21 is a detail view of the implementation of a wave engine device shown in FIG. 20.

Figure 26:
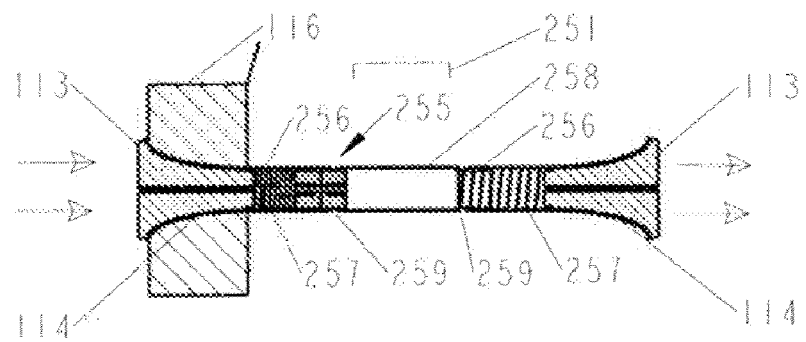
FIGS. 26 through 28 depict a portion of a cycle of a wave engine device of the present invention having slide valves associated therewith.
Figure 27:
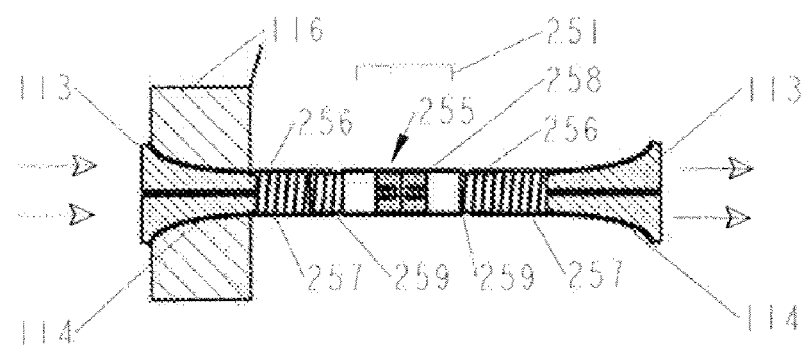
Figure 28:
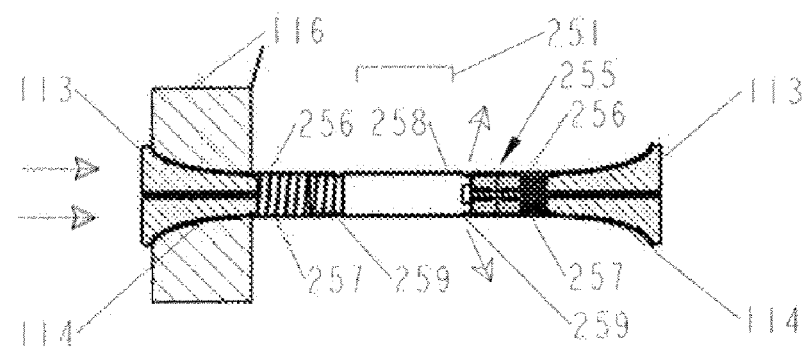
Figures 29, 30, 31:
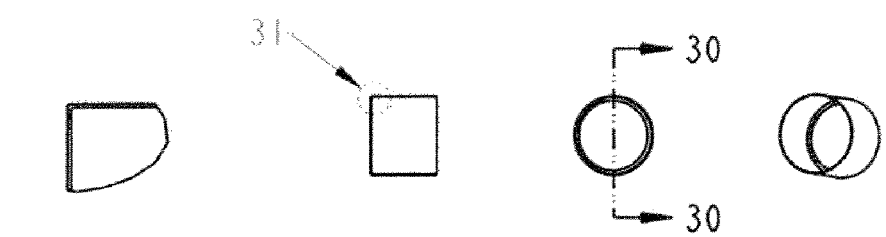

FIGS. 29 through 31 provide detail views of a hollow slider of the implementation of a wave engine device depicted in FIGS. 26 through 28.

FIG. 32 is a top view of a rigid structural array constructed in accordance with the teachings of the present invention.

Figure 33:
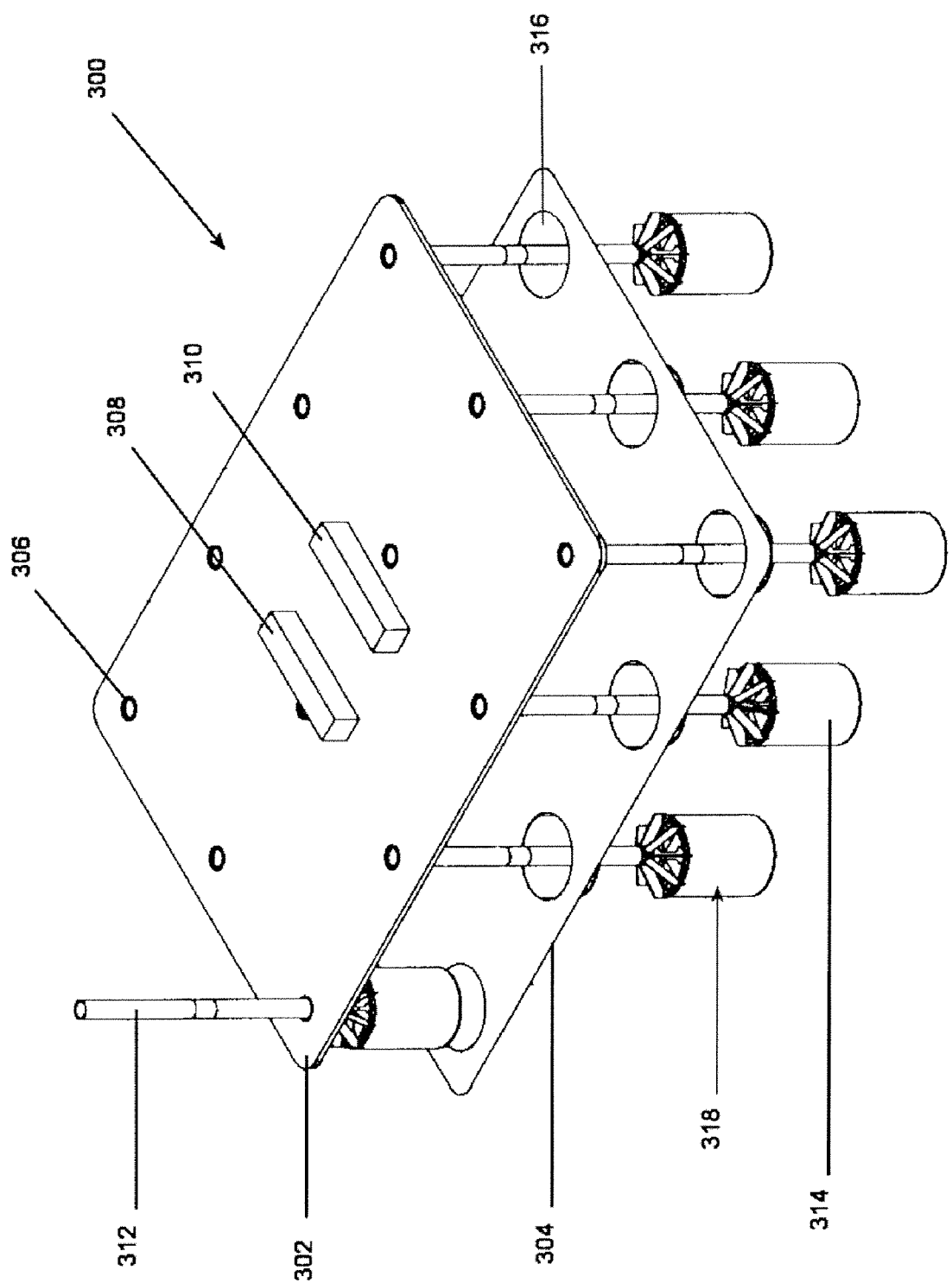

FIG. 33 is a perspective view of a rigid structural array constructed in accordance with the teachings of the present invention.

Figure 34:
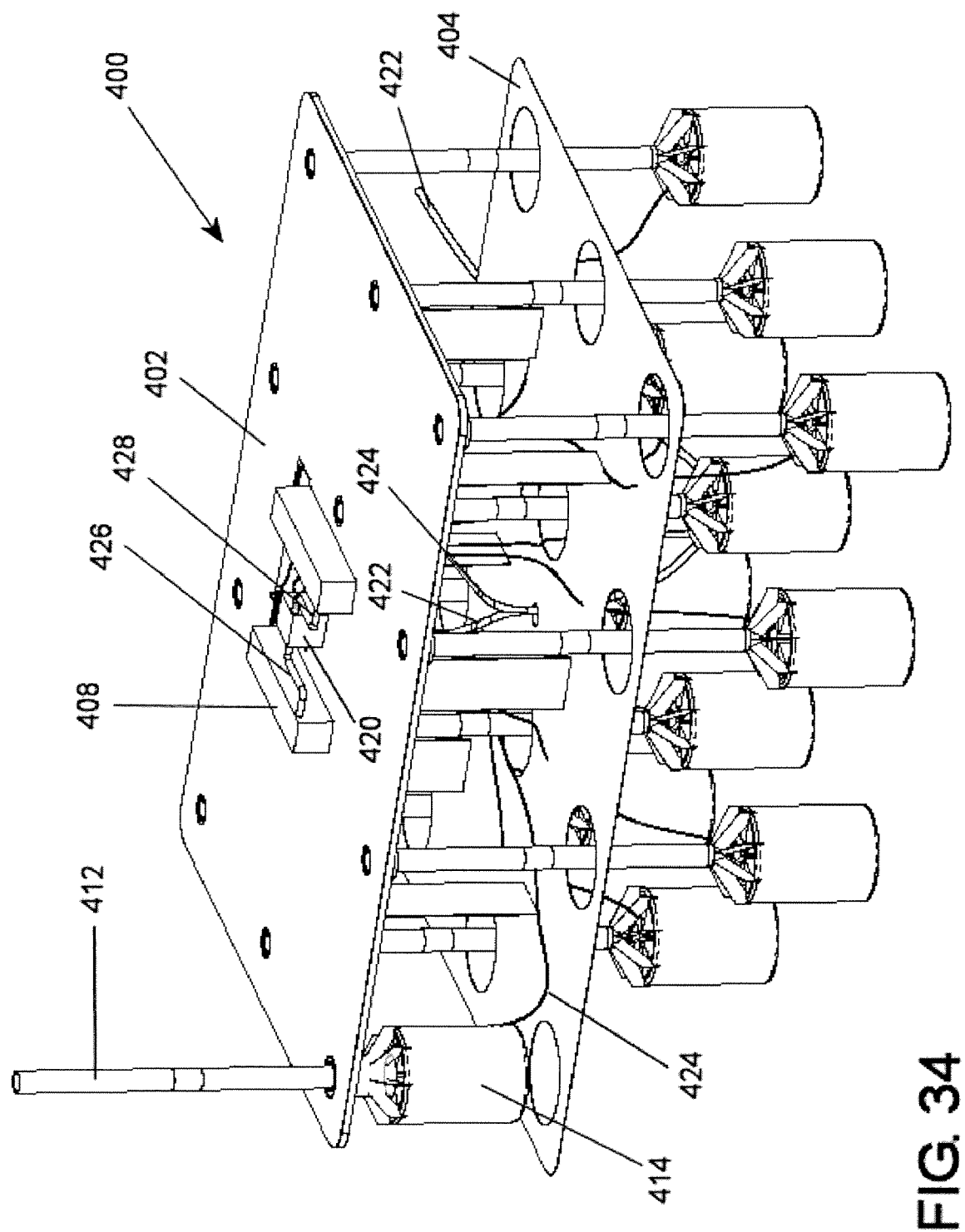

FIG. 34 is a perspective view of one implementation of a rigid structural array constructed in accordance with the teachings of the present invention and showing various conduits associated therewith.

DETAILED DESCRIPTION OF THE INVENTION

Described herein is a device including a piston engine capable of recovering usable power from a passing water wave. In a preferred implementation of the present invention, the wave engine is integrated into the structure of a spar buoy. The device harnesses energy produced from mechanical power in the form of a mass flow field in a wave traveling across a body of water. Particles of water at and below the surface of the water are induced into an approximately elliptical orbit by the passing wave. These particles, taken in mass, are directed along a controlled path by an open cylinder whereupon they perform work in the form of moving a piston. In a preferred implementation, the present device is provided with a mooring line which serves to moor the device to the bottom surface of a body of water. These and other features of a wave engine device are described now in more detail.

The various components of a wave engine device are described in greater detail with reference to FIGS. 5 through 25, below. Various implementations of a wave engine device, as well as under underlying principles associated therewith, are now described generally with reference to FIGS. 1 through 4.

Figure 1:
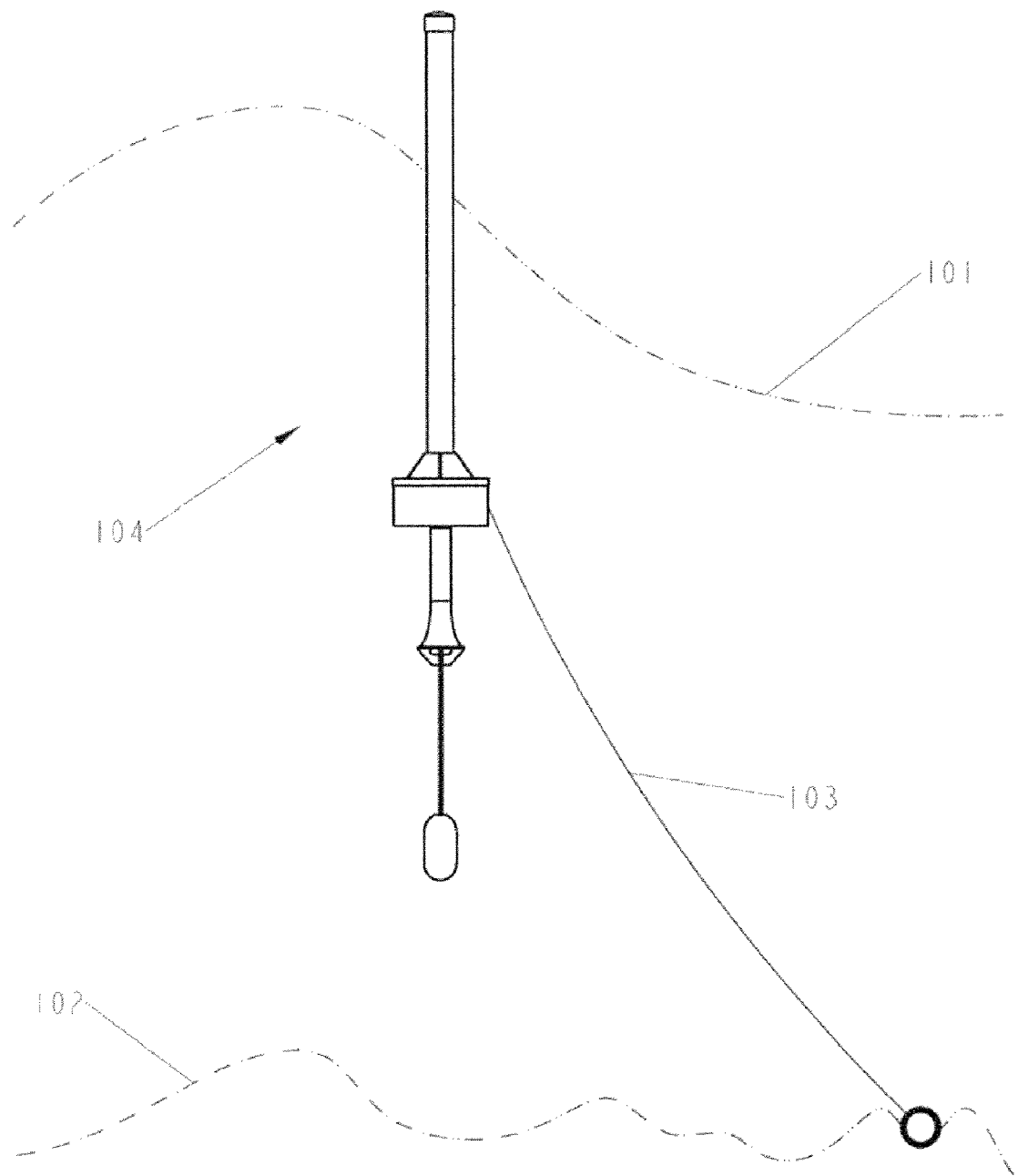
FIG. 1 is a side elevation view of one implementation of a wave engine device adapted for use with a linear alternator.

FIG. 1 provides a schematic illustration of the placement of an exemplary implementation of a wave engine device 104 in operable position within a body of water. As can be seen from the figure, wave engine device 104 is preferably a free-floating device. An attachment portion, namely mooring line 103, is shown attached to wave engine device 104 and securing it to the bottom surface 102 of the body of water in which wave engine device 104 is being utilized. As is also shown in the figure, a portion of wave engine device 104 is preferably positioned above water line 101, while the remainder of wave engine device 104 is positioned below water line 101. It is contemplated that the arrangement shown in FIG. 1 is but one implementation of a wave engine device, and that other implementations, described below, may also be utilized.

Any suitable means of mooring the present device may be utilized, and the device may occupy any suitable position within a body of water. A free-floating wave engine device 104 is preferably moored to a single point on the bottom of a body of water so that it does not float away from its desired location. The mooring described herein does not contribute significantly to the reaction of wave engine device 104 to a passing wave. It is contemplated that a plurality of wave engine devices 104 may be positioned in an array, with the specific location of each wave engine device 104 determined by currents and the mooring of each device to the bottom of a body of water. It is further contemplated that mooring line 103 may also act as a structural member for electrical energy or plumbing to carry the high-energy product of wave engine device 104 to a central collection point located, for example, on the bottom of the body of water. The product of several wave engine devices 104 can be combined for use at the collection point or at a separate mooring, or for transportation to another location beneath the surface of the water or on shore.

The housing portion of the present device (such as cylinder 115, described below, for example) captures and directs water flow from passing waves into a central axis thereof. The length of the cylinder is sufficient to enclose a prime mover piston over its functional stroke, and to house any required valving or other components described below. The open ends of the cylinder preferably lie below the expected maximum trough depth of a passing wave, such that the open ends remain submerged beneath the surface of a body of water in which wave engine device 104 is placed, but relatively close to the surface thereof. Any wave passing through a body of water in which wave engine device 104 is placed, regardless of wavelength, will impart a field velocity to the water inside of and surrounding the cylinder. In a preferred implementation of a wave engine device, the open end of the cylinder is bell or cone shaped, or includes a bell or cone shaped receiving portion attached thereto or formed as a portion thereof, in order to capture a portion of the water's inertia greater than that which would be captured by the cylinder's diameter.

Figure 2:
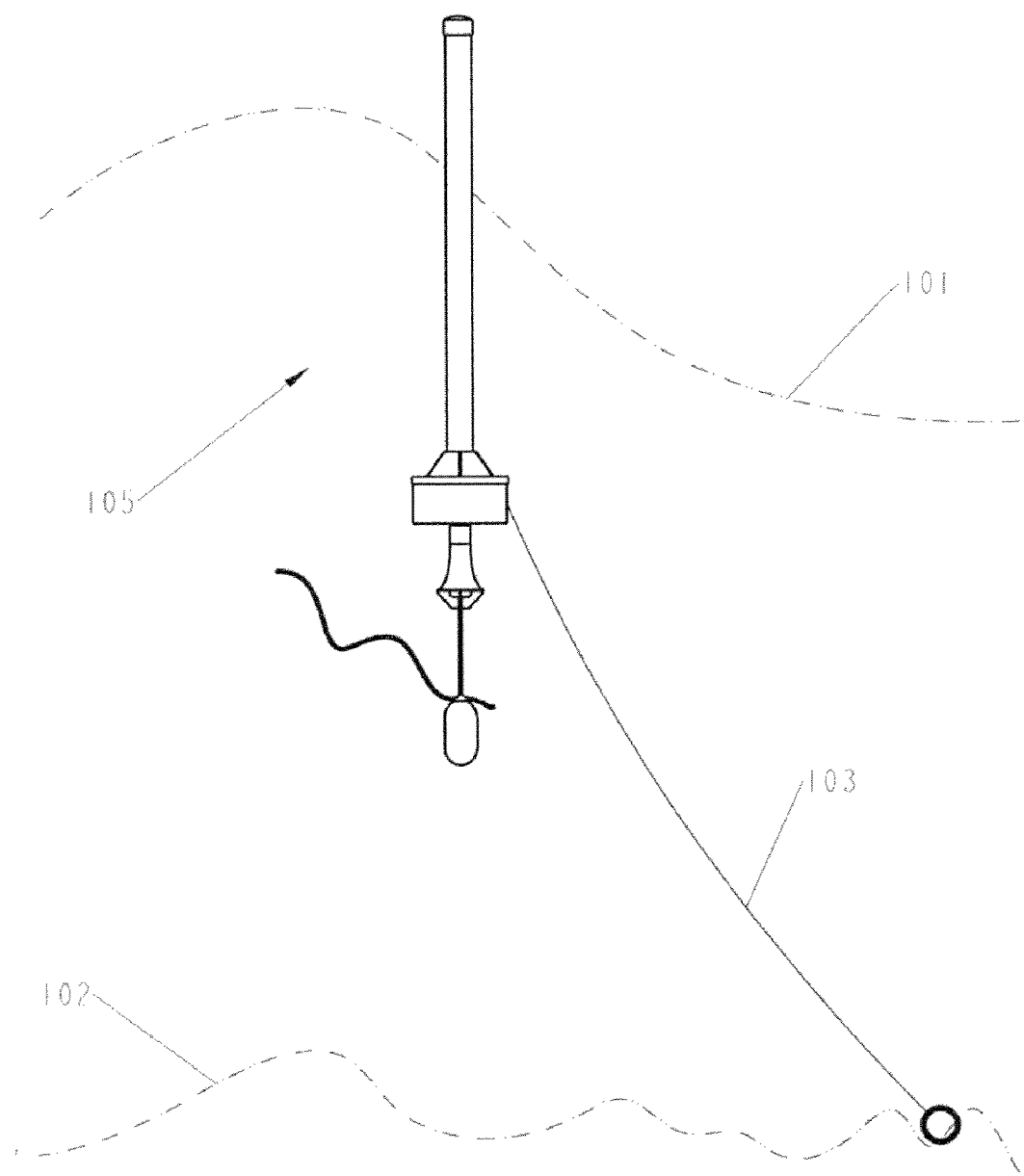
FIG. 2 is a side elevation view of an alternative implementation of a wave engine device adapted for use with a linear pump.
Figure 3:
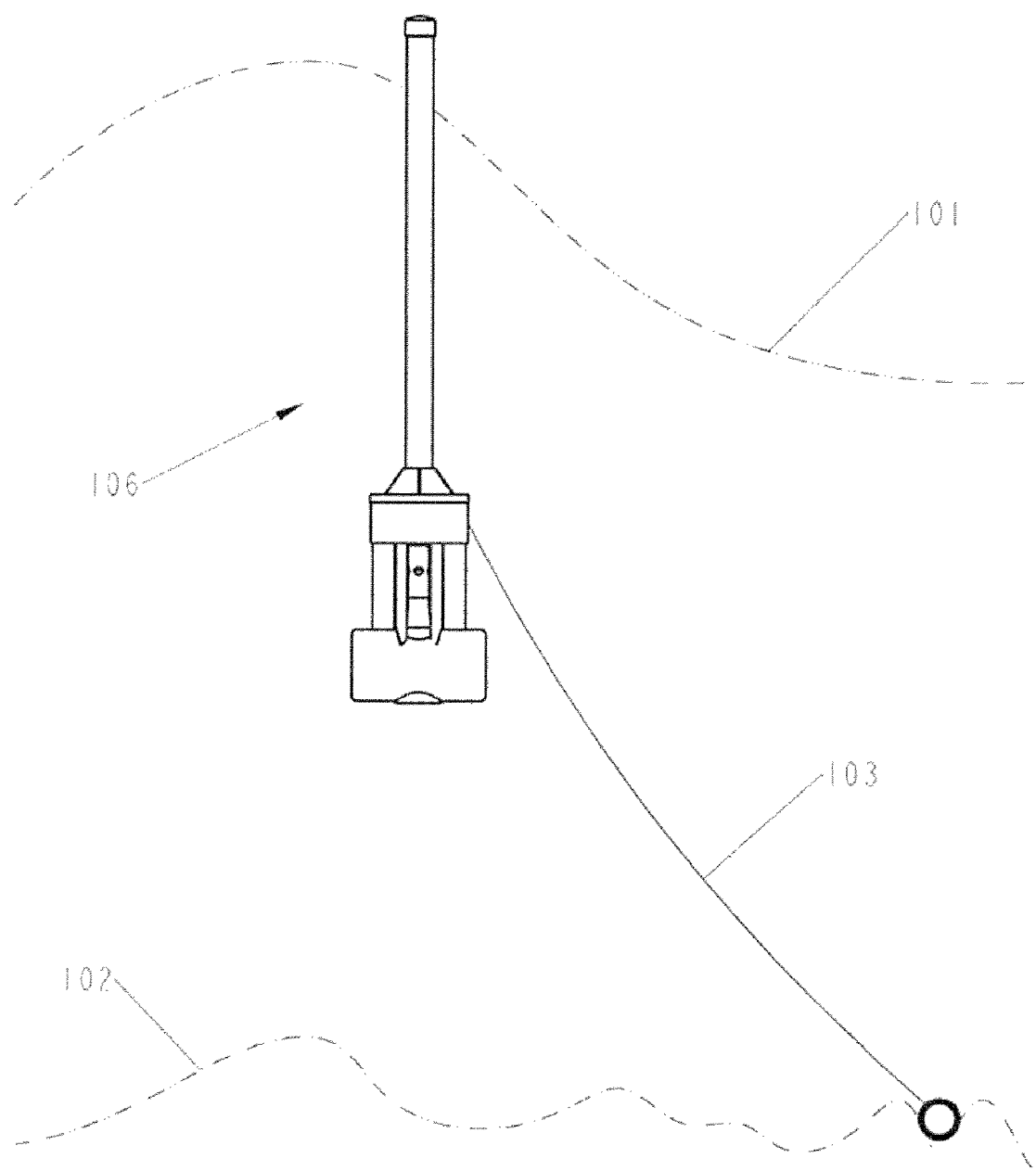
FIG. 3 is a side elevation view of an alternative implementation of a wave engine device adapted for use with a rotary slider-crank engine.

The implementation of a wave engine device shown in FIG. 1 is adapted for use with a linear alternator associated therewith. The implementation of a wave engine device shown in FIG. 2 is adapted for use with a linear pump associated therewith. FIG. 3 provides an exemplary implementation of the present device adapted for use with a rotary slider-crank engine.

Figure 4:
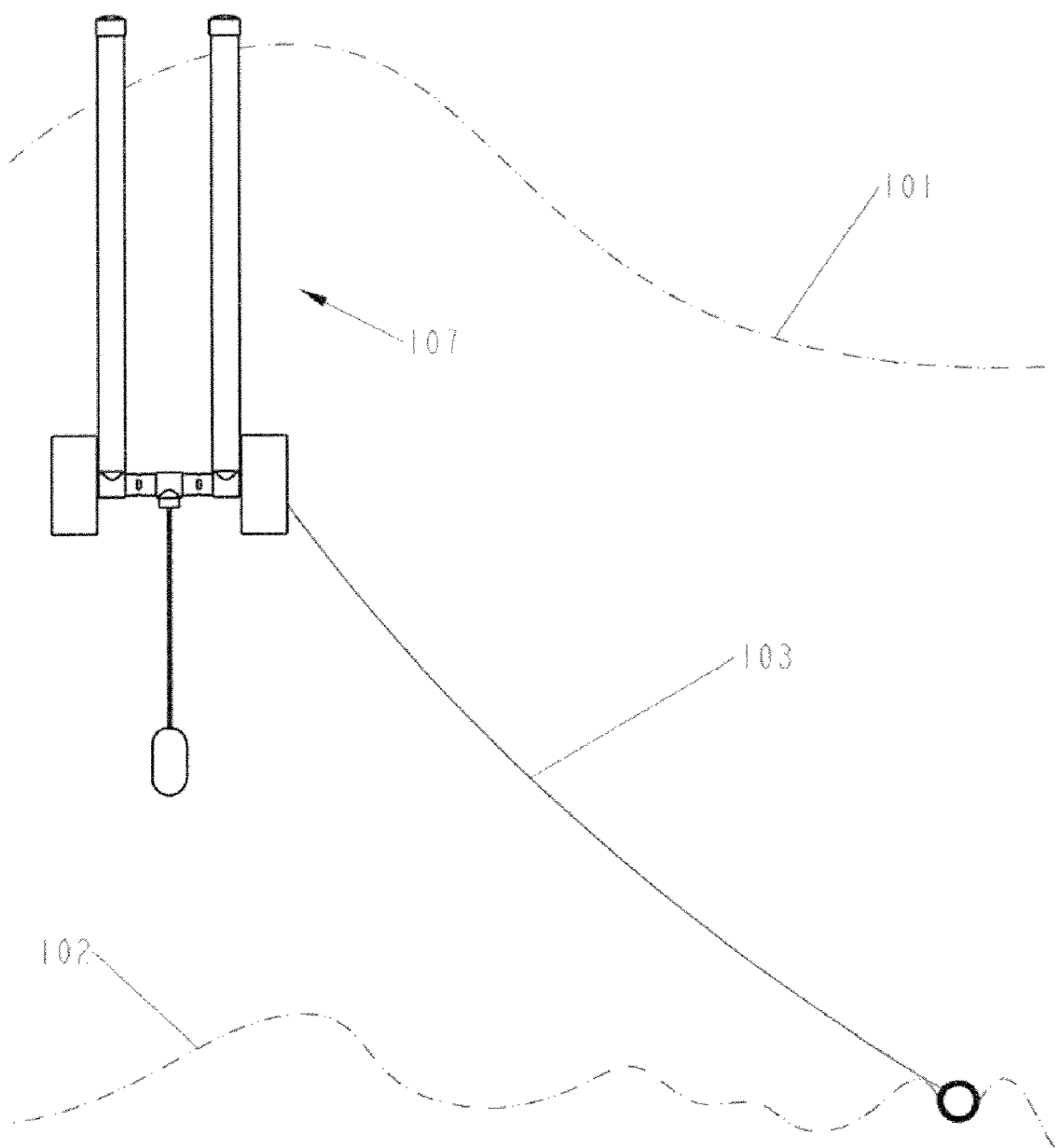
FIG. 4 is a side elevation view of a wave engine device having two spar floats associated therewith.

In the implementation of the present device shown in FIG. 4, the device is adapted for use with a linear pump oriented in a horizontal position. In this implementation of a wave engine device, two spar floats are provided for stability. A horizontal cylinder is provided between the spar floats, the cylinder preferably housing a piston therein. Main floats are provided at either end of the cylinder. Despite the horizontal orientation of the cylinder in this implementation of a wave engine device, the functionality of the device is substantially similar to that of vertical implementations described below. It is contemplated, however, that this implementation of a wave engine device is able to function effectively near the bottom surface of a body of water, and may also rotate when used near the surface of a body of water, exposing the open ends of the device to a greater amount of flow for a longer period of time, thereby producing a greater amount of energy than a comparable device that is unable to rotate relative to a flow.

The above and other implementations of a wave engine device, as well as various components thereof, are now described more fully.

Figure 5:
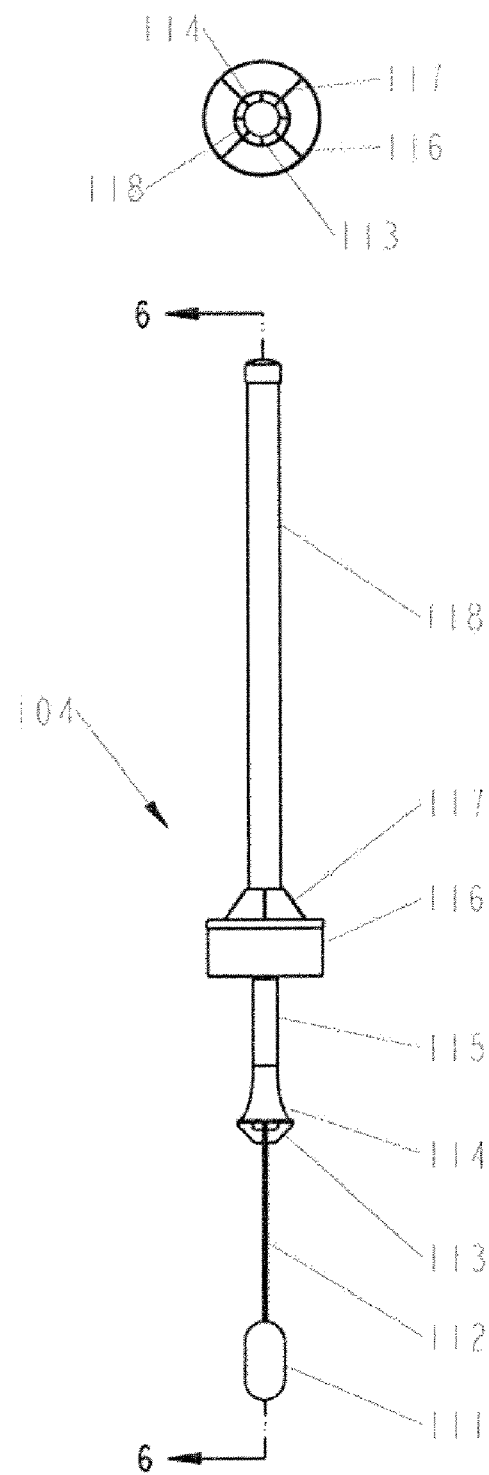
FIG. 5 is a side elevation view of an implementation of a wave engine device adapted for use with a linear alternator and having a top elevation view of the same included therewith.

FIG. 5 provides a side elevation view of a wave engine device 104 constructed in accordance with the teachings of the present invention, as well as a bottom sectional view of bell end 114 thereof. The implementation of wave engine device 104 shown in FIG. 5 includes various components common to other implementations of a wave engine device. As can be seen in the figure, wave engine device 104 preferably includes a bottom weight 111 for adding a desired mass to wave engine device 104 and providing added stability thereto. A weight attachment rod 112 is shown attaching bottom weight 111 to the remainder of wave engine device 104. It is contemplated, however, that any suitable structure for attaching bottom weight 111 to wave engine device 104 may be utilized. The size or mass of weight utilized is variable depending on the desired positioning of wave engine device 104 within a body of water. The same is true of the various floats associated with the present device.

Support baffles 113 are shown in the side elevation view of wave engine device 104 in FIG. 5, as well as in the bottom elevation view of bell end 114 of wave engine device 104, also included in FIG. 5. Baffles 113 are preferably provided with the present device in order to support concentric portions of an integrated power transducer engine (described more fully below).

Bell end 114 is provided in order to direct a greater portion of a wave's flow field into a cylinder 115 of wave engine device 104, whereupon the flow field can act on a piston as described below. While bell end 114 is referred to herein as being bell-shaped, and is shown having a particular configuration in the drawings, it is contemplated that any suitable structure for increasing entry of a wave's flow field into cylinder 115 may be utilized.

Figure 6:
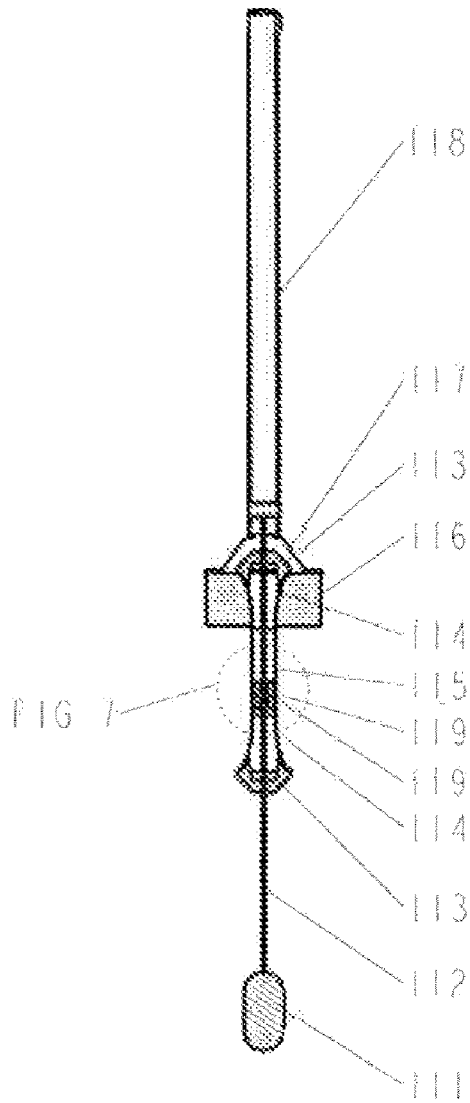
FIG. 6 is a sectional view of the implementation of a wave engine device shown in FIG. 5.
Figure 7:
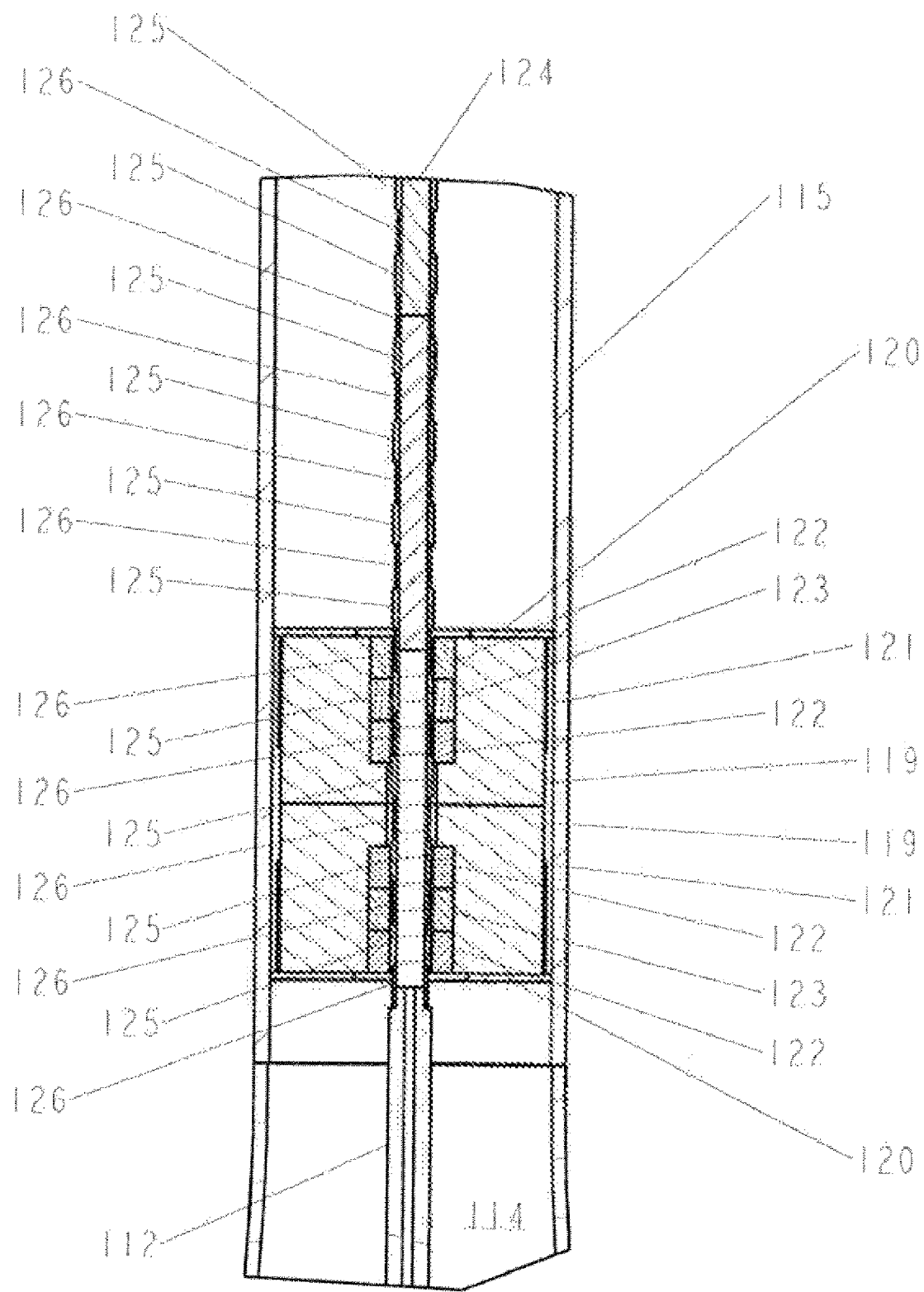
FIG. 7 is a detail view of the implementation of a wave engine device shown in FIG. 6 depicting an integrated linear alternator transducer portion of the device.

Cylinder 115 includes a central bore along a longitudinal axis thereof and preferably houses a prime mover piston 119 that is adapted to move along a length of the central bore of cylinder 115. As best seen in FIGS. 6 and 7, the ends of cylinder 115 are structured in such a way as to retain piston 119 within the central bore of cylinder 115. Cylinder 115 may be variable in length, although it is contemplated that cylinder 115 should be of a length sufficient to allow piston 119 to move along a useful stroke. Piston 119 is acted on by the momentum of the water in which wave engine device 104 is placed. This momentum causes piston 119 to move with some force, thereby allowing work to be done as a result of this movement. Water inertia is preferably allowed to accumulate by cylinder 115 and prime mover piston 119 before power is taken off from piston 119. Prime mover piston 119 is preferably allowed to travel freely over a small distance while inertia builds before any power is converted, such as by a transducer, into useful form. Piston 119 may be the prime mover for a linear alternator, linear pump, slider crank, or other suitable power take-off mechanism. The work product of wave engine device 104 can take the form, for example, of power stored in a rotating flywheel, increased hydraulic pressure of a working fluid, intensified pressure of seawater to facilitate desalination, or directly as electrical energy from an integral alternator generator. Power in these forms is easily convertible by known methods and can be put to a variety of uses.

A valve is preferably provided at the end of the stroke of piston 119 within cylinder 115 in order to allow excess water to be diverted around piston 119 at the end of the piston's useful stroke. Alternatively piston 119 may be stopped beyond a straight, cylindrical portion of cylinder 115 in order to allow excess water to flow around piston 119 without affecting piston 119.

A main float 116 is preferably provided to provide buoyancy to wave engine device 104, although it is preferred that the buoyancy provided by main float 116 is insufficient to cause wave engine device 104 to float to the surface of a body of water. Additional buoyancy is provided by a spar float 118 that preferably pierces the surface of the water and also allows wave engine device 104 to maintain a substantially vertical position with respect to a longitudinal axis of cylinder 115. A spar bracket 117 may be provided to more effectively secure spar float 118 to the rest of the device. Because of the relatively small cross-section of spar float 118, changes in the depth of wave engine device 104 caused by passing waves do not significantly affect the buoyancy of wave engine device 104. Wave engine device preferably floats vertically in a body of water and does not respond to passing waves by rapidly changing its position with respect to the bottom of the body of water. This is due to the fact that wave engine device 104 has a naturally long heave period relative to that of a passing wave and this natural low frequency of the device allows it to remain largely immune to the effects of a passing wave. With respect to an observer of wave engine device 104, the device remains approximately stationary.

FIG. 6 provides a sectional view of the wave engine device 104 shown in FIG. 5, showing the internal prime mover piston 119, shown in two adjacent sections (both of which are indicated by the numeral 119). FIG. 6 also shows the various components of wave engine device 104 described with respect to FIG. 5, above.

FIG. 7 provides a detailed view of prime mover piston 119 as housed within cylinder 115. In the detailed view provided in FIG. 7, the implementation of wave engine device 104 shown includes an integrated linear alternator transducer. The integrated linear alternator transducer is a component of the engine of the device, which includes piston 119, piston seals 120, antifriction material 121, large torroidal magnetic conductors 122, torroidal permanent magnets 123, cylinder 115, rod magnetic conductor 124, torroidal copper wire coils 125, and small torroidal magnetic conductors 126.

A piston subassembly 110 such as that shown in FIG. 7 (and more specifically identified in FIG. 8) preferably contains one or more phases or magnetic circuits. The magnetic circuit (or phase) may include, for example, two large torroidal magnet conductors 122 on each side of a torroidal magnet 123, the large torroidal magnet conductors 122 being in physical contact with torroidal magnet 123 and mounted concentrically in each of the sections of piston 119. In a preferred implementation of wave engine device 104, each phase is separated by a distance equal to an integer multiple of the distance between torroidal coils 125, plus that distance divided by the number of piston subassembly phases. The length 108 of the linear alternator transducer is less than the travel available to prime mover piston subassembly 110. The linear alternator consists of a series of poles at a regular distance mounted on rod magnetic conductor 124. Each linear alternator pole is made by a torroidal wire core 125 mounted over rod magnetic conductor 124 and separated by small torroidal conductors 126.

Figure 8:
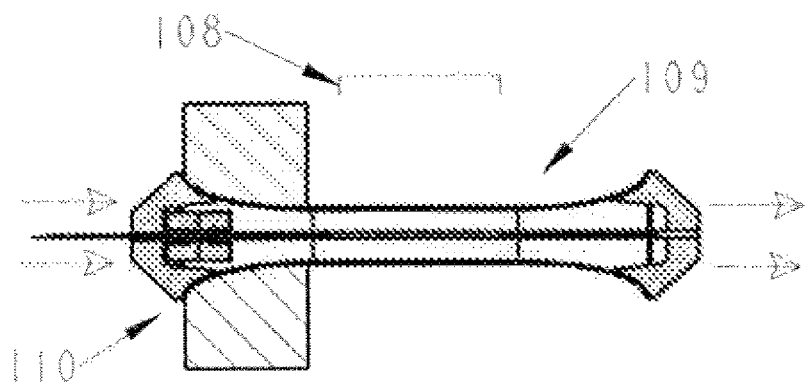
FIGS. 8 through 11 depict a portion of a cycle of a wave engine device of the present invention having a linear alternator integrated therein.
Figure 9:
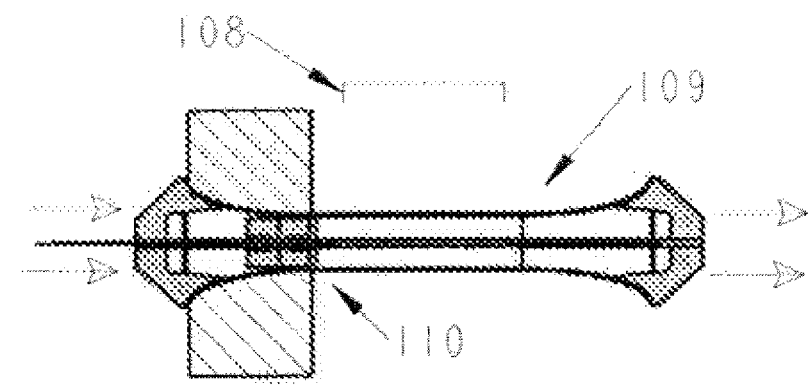
Figure 10:
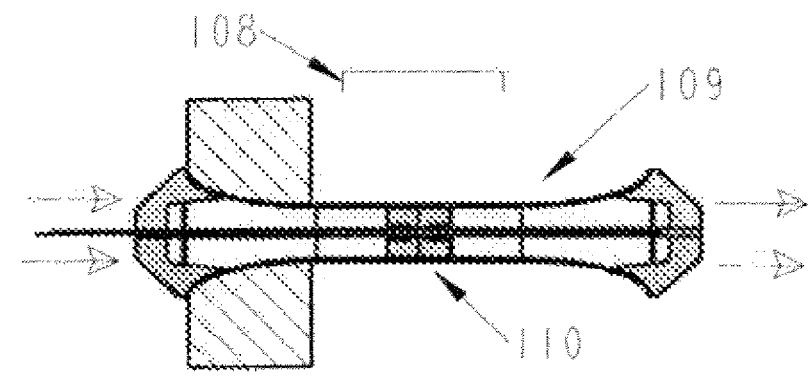
Figure 11:
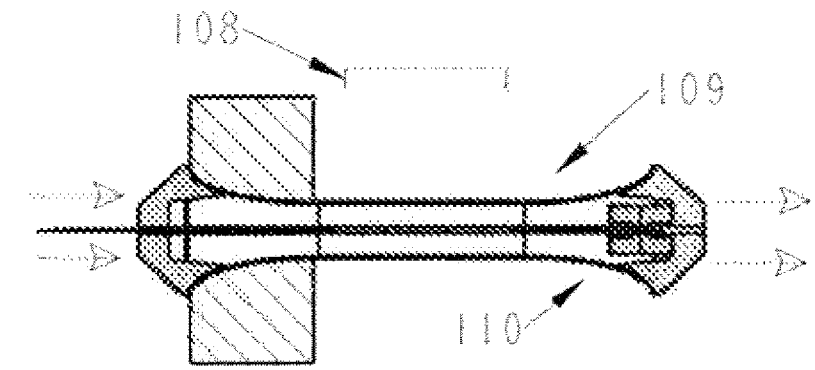

Turning now to FIGS. 8 through 11, a series depicting one half of the linear alternator integrated spar buoy engine's operating cycle is shown. These figures depict the functionality of wave engine device 104 when an approximately sinusoidal wave passes in the water around the wave engine device 104, creating an analogous subsurface flow field. Initially, wave the active components of wave engine device 104 are arranged as shown in FIG. 8; the piston subassembly 110, which includes two sections of piston 119, piston seals 120, antifriction material 121, large torroidal magnetic conductors 122, and permanent torroidal magnets 123, is at the top of its limit of travel. Water flows into a top portion 109 of the fluid conducting portion of wave engine device 104. Piston subassembly 110 is free to move without engaging length 108 of the linear alternator region of wave engine device 104. After traveling some distance, as shown in FIG. 9, inertia is present at prime mover piston subassembly 110 and the subassembly can begin to enter length 108 of wave engine device 104, containing a linear alternator of the device, to create electrical potential and current. In FIG. 10, prime mover piston subassembly 110 is fully engaged in the linear alternator located in length 108 of the present device, and is producing usable power. Electrical power emerges from the alternator's poles, is rectified by diode bridge or other suitable method known in the art (not shown), and all poles' outputs are summed together for use (not shown). FIG. 11 shows prime mover piston subassembly 110 after it has traveled beyond length 108 of the present device containing the linear alternator transducer. Prime mover piston subassembly 110 preferably moves into a bell end 114 where the fluid conductor becomes significantly larger than the diameter of piston 119 and fluid is allowed to pass around piston subassembly 110 without creating substantial force on the surface of piston 119. The wave's flow field reverses itself during the second half of wave. With reversal of the wave's flow field, piston subassembly 110 is forced to travel in the opposite direction, completing the engine's cycle and awaiting another wave to begin the cycle again.

FIG. 12 shows both side and top elevation views of the external components of an implementation of the present wave engine device 105 having an integrated linear pump with piston overtravel valving. Bottom weight 111 is provided, as are dual check valve 153, secondary pump cylinder 154, support baffles 113, bell end 114, cylinder 115, main float 116, spar bracket 117, and spar float 118. The components of the implementation of wave engine device shown in FIG. 12 that are present in the implementations of the present device previously described function in substantially the same manner as described above. Other components of this implementation of wave engine device 104 are described more fully below.

FIG. 13 is a sectional view of the implementation of wave engine device 105 shown in FIG. 12 and described briefly above. An inlet fluid connector 151 is directly attached to dual check valve 153, allowing working fluid to pass in one direction (inlet to outlet) only. An outlet connector 152 and secondary pump cylinder 154 are connected between check valve elements (not shown), and a plunger 156 is connected by a yoke to prime mover piston 155. The diameter of plunger 156 is preferably smaller than that of prime mover piston 115, causing the development of a greater pressure in secondary pump cylinder 154 than is experienced by prime mover piston 155. Pressure in secondary cylinder 154 is retained by seals 157 present on an end of plunger rod 156. Pressurized working fluid is allowed to flow to outlet connector 152 by dual check valve 153. FIG. 14 provides a detailed view of seals 157 located at an end of plunger 156 inside secondary pump cylinder 154.

Figure 15:
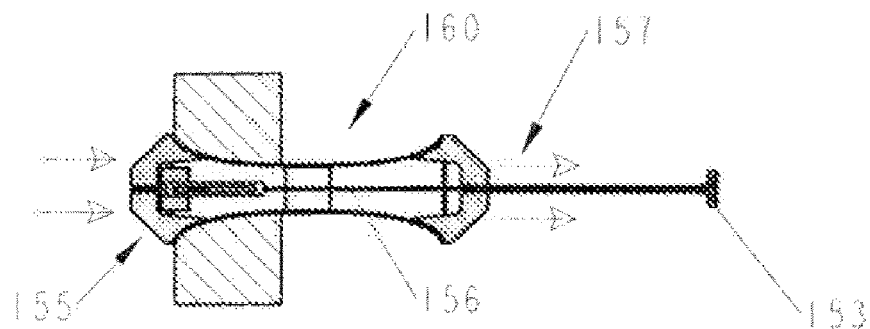
FIGS. 15 through 18 depict a portion of a cycle of a wave engine having a linear pump associated therewith.
Figure 16:
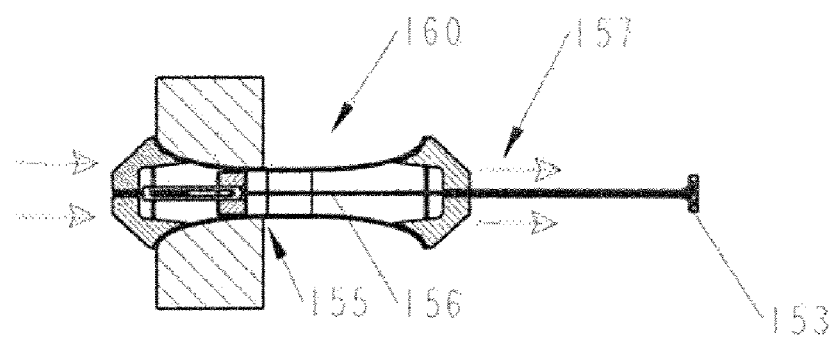
Figure 17:
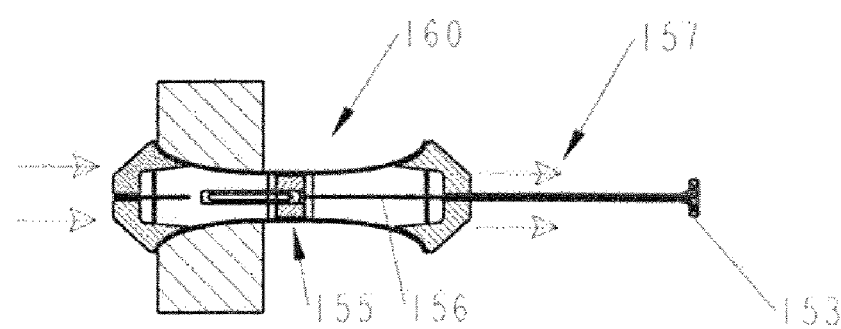
Figure 18:
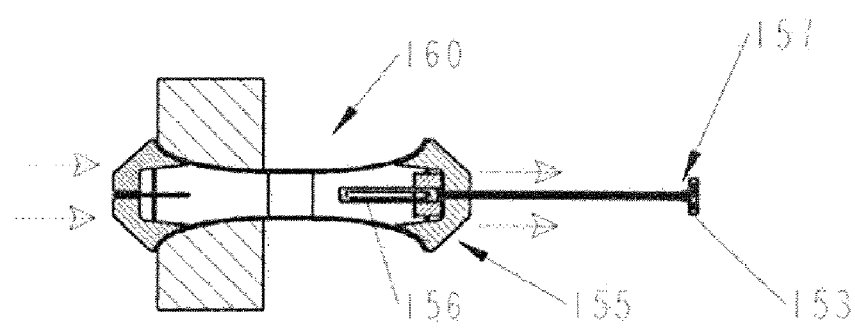

FIGS. 15 through 18 provide a series depicting one half of the operating cycle of the implementation of wave engine device 105 shown in FIGS. 12 through 14 (i.e. an implementation of the present device having an integrated linear pump provided therein). These figures depict the functionality of wave engine device 105 when an approximately sinusoidal wave passes in the water around the wave engine device 105, creating an analogous subsurface flow field. Initially, the active components of wave engine device 105 are arranged as shown in FIG. 15, with piston 155 at the top of its limit of travel. Water flows into a top portion 160 of the fluid conducting portion of wave engine device 105. Piston 155 is free to move within a slot housing plunger 156 without engaging plunger 156. After traveling some distance as shown in FIG. 16, inertia is present at prime mover piston 155 and it reaches the end of the slot housing plunger 156, causing plunger 156 to begin to move. In FIG. 17 prime mover piston 155 is acting on plunger 156 to create pressure in secondary cylinder 154, below plunger seals 157. FIG. 18 shows prime mover piston 155 after it has traveled to the end of its useful stroke. Prime mover piston 155 is moved into a bell end 114 where the fluid conductor becomes significantly larger than the diameter of piston 155 and fluid is allowed to pass around prime mover piston 155 without creating substantial force on the surface of piston 155. The wave's flow field reverses itself during the second half of wave. With reversal of the wave's flow field, piston 155 is forced to travel in the opposite direction, completing the cycle of wave engine device 105 and awaiting another wave to begin the cycle again.

FIG. 19 provides side and top elevation views of the external components of an implementation of wave engine device 106 having an integrated slider crank portion with piston port valving. Shown in FIG. 19 are crankcase 201, cylinder bell extension 202, support struts 203, cylinder 204, cylinder ports 209 main float 116, spar bracket 117, and spar float 118.

FIG. 20 provides a sectional view of wave engine device 106 having a slider crank integrated therein. Components are analogous to a typical external combustion slider crank engine arrangement. A piston 205 fits closely inside of a cylinder 204 and is connected by a wrist pin 206 to a connecting rod 207. The connecting rod in turn acts upon a crankshaft 208.

As shown in FIG. 21, crankshaft 208 is supported by a crankcase 201 with rotary seals 210 prohibiting intrusion of water into the crankcase volume. A sprag (a one way rotation device) is preferably incorporated into internal support bearings 211, which support crankshaft 208. A flywheel 213 and rotary input machine 212 are also preferably connected to the crankshaft by a sprag (not shown).

Figure 22:
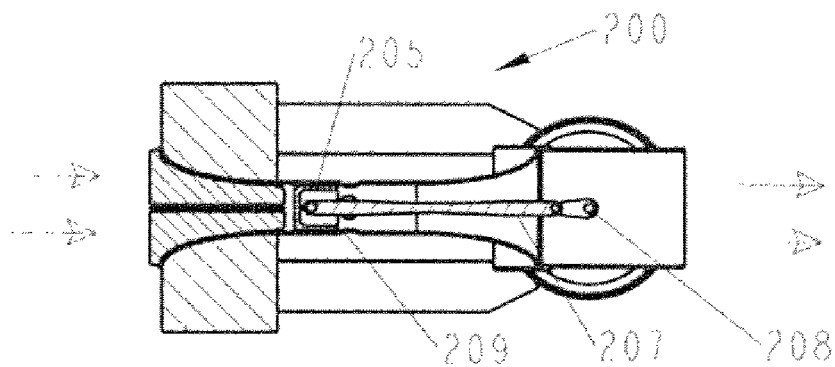
FIGS. 22 through 25 depict a portion of a cycle of a wave engine device of the present invention having a slider crank associated therewith.
Figure 23:
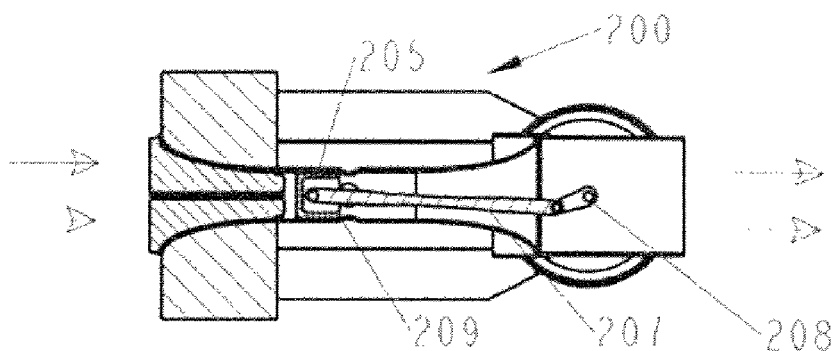
Figure 24:
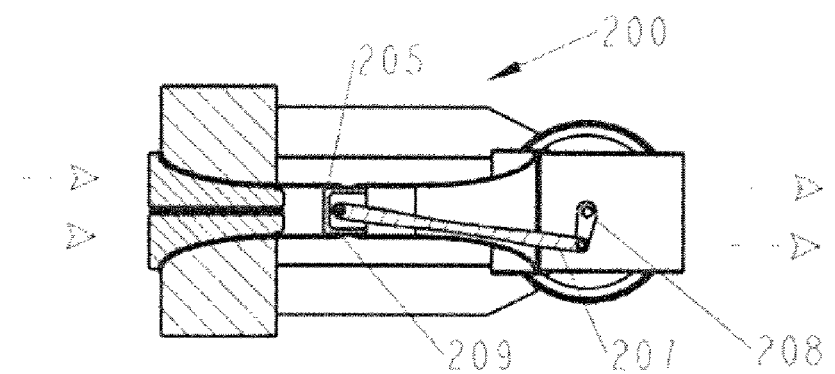
Figure 25:
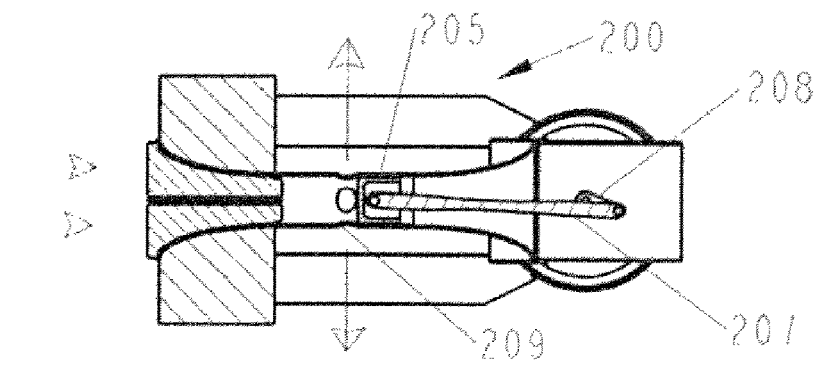

FIGS. 22 through 25 provide a series depicting one half of the operational cycles of a wave engine device 106 having a slider crank integrated therewith. These figures depict the functionality of wave engine device 106 when an approximately sinusoidal wave passes in the water around the wave engine device 106, creating an analogous subsurface flow field. During the initial portion of the cycle, the active components of wave engine device 106 are arranged as shown in FIG. 22. Piston 205 is at the top of its limit of travel and water is flowing into a top portion 200 of a fluid conducting portion of wave engine device 106. It is assumed for purposes of this illustration that flywheel 213 is rotating due to the influence of previous waves. FIG. 23 depicts prime mover piston 205 as moving down due to the flowing water, thereby imparting rotation to crankshaft 208 via connecting rod 207. As piston 205 is accelerated down its path by incoming water, accumulating inertia as it moves, the rotation rate of crankshaft 208 will approach that of flywheel 213. FIG. 24 illustrates the position of piston 205 when the rotation speed of crankshaft 208 overtakes that of flywheel 213, whereupon energy is stored in flywheel 213. Power is preferably continually taken from flywheel 213 by rotational input machine 212. As shown in FIG. 25, as the wave half passes and the rotational speed of crankshaft 208 slows, energy stored in flywheel 213 remains, less what is consumed by rotational input machine 212. Piston 205 is moved beyond the cylinder's ports 204 and any flowing water is allowed to flow out of the path of piston 20. The wave's flow field reverses itself during the second half of wave. With reversal of the wave's flow field, piston 205 is forced to travel in the opposite direction, completing the cycle of wave engine device 106 awaiting another wave to begin the cycle again.

FIGS. 26 through 28 provide a series depicting one half of an operating cycle of an implementation of wave engine device 104 having slide valves operable associated therewith. As with the series describe above, these figures depict the functionality of this implementation of wave engine device 104 when an approximately sinusoidal wave passes in the water around the wave engine device 104, creating an analogous subsurface flow field. Initially, the active components of this implementation of wave engine device 104 are arranged as shown in FIG. 26. Piston 255 is near the top of its limit of travel and water is flowing into a top portion of the fluid conducting portion the wave engine device, past top slider 257 and spring 256 to act on prime mover piston 255. Top cylinder ports 259 are covered by prime mover piston 255, which is moving down cylinder 258 and accumulating inertia before engaging power transducer region 251. FIG. 27 shows prime mover piston 255 moving in power transducer region 251 of the wave engine device 104. Slider 257 has moved to cover side port 259 by spring 256 and water is flowing down cylinder 258. The hollow slider 257 is shown in detail in FIGS. 29 through 31. In the state of the present device shown in FIG. 27, power is being transferred to power transducer 251 by prime mover piston 255. Prime mover piston 255 has reached the end of its useful stroke at the point illustrated in FIG. 28 and has moved slider 256 back, compressing spring 257. Piston 255 has moved beyond the cylinder's port 259, and water which would normally act on piston 255 is diverted out of the ports.

Although specific implementations of a wave engine device are described above, those implementations are meant to be illustrative of the broad teachings of the present invention. Engine and valve arrangements described above, for example, are illustrative and wave engines devices described herein are not intended to be limited to the engine and valve combinations described above. Various other combinations will be apparent to those of skill in the art upon reading this disclosure. Further, although the various implementations of wave engine device 104 are described and depicted herein as being substantially vertical when placed in operable position, it is contemplated that implementations of wave engine device 104 may be provided in a horizontal orientation, or oriented at any other suitable angle.

Likewise, the wave engine devices described herein are not limited to any specific materials for use in construction of the device, and any suitable materials may be used for the various structures and functionalities described herein. Antifriction materials suitable for use with the present device may include, for example, materials constructed from synthetic polymers, synthetic copolymers, carbon fiber materials, silicon-based materials, graphite materials, metals materials such as titanium nitride-based materials, and the like, as well as combinations thereof.

Now described in detail is a rigid structural array constructed in accordance with the principles of the present invention. The rigid structural array is adapted for use with multiple wave engine devices as described above. The term "ocean wave energy converter" (OWEC) will be used hereinafter to refer generally to the various wave engine devices described above, as well as to other devices adapted to harness the energy of wave motion and suitable for use with the present invention. Thus, the term "ocean wave energy converter" is used generally to refer to any floating device for producing electricity and/or potable water from wave energy harnessed from a body of water.

Turning now to FIG. 32, a top view of a rigid structural array of the present invention is presented. The rigid structural array is indicated generally by the numeral 300, and includes an upper deck 302, a lower deck 304, and openings 306 adapted to receive at least a portion of an OWEC utilized in conjunction with the present invention. Rigid structural array 300, and the various components thereof, may be constructed from any suitable material, though it is preferred that the construction material be in part resistant to the harsh effects of an ocean environment.

FIG. 33 provides a side perspective view of rigid structural array 300 with a number of OWECs 314 associated therewith. As can be seen in the figure, rigid structural array 300 includes an upper deck 302, and a lower deck 304. Upper deck 302 includes a plurality of openings 306 adapted to receive a first portion of at least one OWEC 318 (such as, for example, spar buoy 312) therein, while lower deck 304 includes a plurality of openings 316 adapted to receive a second portion of at least one OWEC 314 therein. Upper deck 302 and lower deck 304 are preferably connected via support members (not shown), and any suitable support members may be used to connect the two decks and maintain the structural integrity of device 300.

As can be seen from the figures, rigid structural array 300 provides a structural framework for maintaining OWECs 314 in a close proximity to one another in an orderly fashion. This structure is superior to methods of tethering multiple OWECs 314 using mooring lines and the like. The rigid structure of the present invention ensures that OWECs 314 will be maintained in a stable relationship to one another, without the drift that accompanies the use of individual mooring lines. The present device further provides a foundational structure for the connection of electrical cables between multiple OWECs 314, and does not place strain on those lines as can happen with individually moored OWECs connected by electrical cables. Further, rigid structural array 300 can protect OWECs 314 from damage that may occur to free-floating OWECs, whether tethered to one another or not.

In addition to providing and maintaining a superior spatial arrangement of OWECs 314, one implementation of rigid structural array 300 allows maintenance to be carried out on OWECs 314 in a relatively simple manner. With free-floating OWECs, for example, whether tethered to one another or not, when maintenance is required due to malfunction of an OWEC or for simple preventative reasons, the OWEC must, at worst, be taken ashore or transported to a dock, boat, or other dry surface. At best, the maintenance will have to be performed while the OWEC is in the water. Transporting the OWEC for maintenance is a time and resource consuming task, and underwater maintenance is complicated by the mere fact of being done beneath the surface of the water. Further, many maintenance operations may not be performed under water at all, requiring that the OWEC be transported to a dry location.

The present device, however, includes lower deck 304 having a plurality of openings 316 associated therewith. Each of openings 316 are sized and shaped to receive the body of an OWEC 314 therethrough. When it is necessary to perform maintenance on one or more OWECs associated with rigid structural array 300, the OWEC or OWECS requiring maintenance can simply be pulled up through openings 316. Once an OWEC 314 has been pulled up through an opening 316 it may be secured in position in any suitable manner. For example, a locking mechanism may be used to hold OWEC 314 in place, or opening 316 may be covered such that OWEC 314 rests on the cover. OWEC 314 is now out of the water and available for maintenance work. Spar buoy 312 associated with the OWEC 314 being maintained continues to protrude through an opening 306 in upper deck 302, and if maintenance is required on spar buoy 312 it can be performed at this time as well.

Because OWECs 314 are held stably and in close proximity to one another by rigid structural array 300, the output of each OWEC 314 is easily harnessed and combined with that of each of the other OWECs 314 associated with a given rigid structural array 300. Of course, the size and shape of rigid structural array 300 may be varied to incorporate more OWECs 314 than shown in the figures. For example, a hexagonal shaped rigid structural array may be used. Rigid structural array 300 may be provided in any suitable geometric shape for optimizing the number and placement of various OWECs 314 associated therewith. Further, the size and shape of rigid structural array 300, as well as the openings 306 and 316 in upper deck 302 and lower deck 304, respectively, may be varied to accommodate OWECs or similar types of devices that differ structurally from those shown herein. Methods for harnessing the electricity produced by the OWECs 314 associated with a given rigid structural array 300 will be known to those of skill in the art upon reading this disclosure. Any suitable method of tapping into the power produced by each individual OWEC 314, and then combining the output of each of the OWECs 314 associated with a rigid structural array 300 may be used. An exemplary implementation having connectors for electricity and potable water output is described with respect to FIG. 34, below. Further, it is contemplated that multiple rigid structural arrays 300 may be connected such as, for example, by electrical cabling, or may even be physically attached to one another to form a larger rigid structural array made up of a plurality of individual rigid structural arrays 300. In such an implementation, two or more rigid structural arrays may be fixedly or removably attached to one another to form the equivalent of a larger array structure having many more OWECs 314 associated therewith. The water or electrical output of these various rigid structural arrays 300 can be easily combined once multiple rigid structural arrays 300 are physically combined, and once rigid structural arrays 300 are physically combined there is no strain on various conduits and connectors connecting the multiple rigid structural arrays 300. This provides an advantage not found in the situation wherein multiple rigid structural arrays 300 are physically separated but connected via conduits.

FIG. 33 further depicts, in box form, possible locations for a water desalination plant 308 or electrical plant 310. Techniques for desalination of water are known, and box 308 is simply an exemplary placement of the necessary structures or devices of a desalination plant on upper deck 302 of rigid structural array 300. Water desalination may be accomplished by, for example, reverse osmosis mechanisms. Exemplary implementations of OWECs 314 shown in the figures can be adapted to produce a water pressure of 1000 psi or more, which is suitable for reverse osmosis processes. Structures or devices for desalination of water may be provided at any suitable location on rigid structural array 300. Because rigid structural array 300 is adapted for use in a salt-water environment, it is contemplated that the water needed for a desalination process will be available in excess. Power generated by OWECs 314 can be used to drive the desalination process, which typically requires a great deal of electrical power. Methods of delivering desalinated water from a rigid structural array 300 to shore or other areas where it can be used will be readily ascertainable by those skilled in the art upon reading this disclosure.

As with the box showing an exemplary location of a desalination plant 308 or other desalination structure, a box is provided in FIG. 33 on upper deck 302 showing an exemplary location of an electrical power plant 310 or similar structure. Electrical plant 310 or similar structure may be located at any suitable location on rigid structural array 300. Methods for providing an electrical plant 310 or similar structure for managing and delivering electrical power produced by OWECs 314 are well known in the art and will be readily apparent to those of skill in the art upon reading this disclosure.

In addition to space for a desalination plant 308 or similar structure, and a power plant 310 or similar structure, available space on upper deck 302 and lower deck 304 may be used for other structures adapted to house processes associated with the present invention. Such processes may include, for example, maintenance functions, and spare parts, tools, and the like may be housed in areas directly on rigid structural array 300, resulting in increased efficiency in maintenance operations.

With respect to implementations of the present rigid structural array 300 having both a desalination plant 308 and power plant 310, it is contemplated that the output of rigid structural array 300 may be switched between electricity and potable water, or that both may be produced simultaneously. The production capacity of the present invention may be divided between water and electricity in any suitable ratio. For example, eighty percent of the capability of the present device may be directed toward production of electricity, with the remaining twenty percent of capability being directed to the production of potable. The percent of capability directed to either water or electricity production may range from zero percent to one-hundred percent. Operators working with rigid structural array 300 are preferably able to select between potable water output, electrical output, or combined output, such that any rigid structural array 300 has the capacity to enter any of these output modes. Delivery of either water, electricity, or both, is preferably controlled by an operator associated with a rigid structural array 300 as necessary or desired. The operator can dispatch the water, electricity, or both, by providing the proper instructions to rigid structural array 300. This process can be controlled mechanically or by computerized systems, and various ways of doing both will be readily apparent to those of skill in the art upon reading this disclosure. Controlling the delivery of either water or electricity can be accomplished in any suitable manner, and a variety of such suitable manners will be readily apparent to those of skill in the art upon reading this disclosure.

Water provided under high pressure by OWECs 314 to power plant 310 may be used to operate, for example, Pelton turbines associated with power plant 310, thereby producing electricity in addition to any electricity being provided by the functioning of OWECs 314. Further, in implementations of the present invention wherein a desalination plant 308 is present, waste water from said desalination plant 308 (such as waste water resulting from the reverse osmosis process, which is also under high pressure) can be used to operate, for example, a Pelton turbine, thereby producing additional electricity. The total electrical output of rigid structural array 300 may be further augmented by placing wind turbines on any above-water portion of rigid structural array 300 where wind will impact and operate the turbines. Likewise, photovoltaic cells or solar thermal collectors may be placed on an uppermost deck of rigid structural arrays 300, or may be attached to and extended away from lower above-water decks in implementations of the present device where more than one dry deck is used, in order to harness solar energy for the further production of electricity.

Although rigid structural array 300 is shown in the figures as including upper deck 302 and lower deck 304, it is contemplated that additional decks may be added as desired or required for providing additional capabilities to rigid structural array 300. For example, an additional deck structure may be provided below the surface of the water for monitoring or interacting with OWECs 314 while they are submerged and in working position. Such an underwater deck provides a rigid structure for use by divers or others engaged in such monitoring activities. Further, an underwater deck would allow simple or routine underwater maintenance to be performed without raising an OWEC 314 to the level of dry lower deck 304. Any such underwater decks are preferably porous to reduce the weight of water bearing down thereupon. The same is preferably true of lower deck 304 in the implementation of the present invention shown in FIGS. 32 and 33.

As noted above and shown in the drawings, lower deck 304 of the present invention includes a plurality of openings. These openings server to render the present device substantially resistant to the action of waves in the body of water in which the present device is placed. The openings in the deck effectively reduce the "surface piercing" of the present device, allowing the device to remain substantially stationary despite the motion of waves in the water.

In addition to an underwater deck, rigid structural array 300 may be provided with one or more additional above-water decks located above the level of upper deck 302. Such additional decks could provide space for storage or other functional components of rigid structural array 300. Any suitable number of decks may be provided with rigid structural array 300 without departing from the scope of the present invention.

Rigid structural array 300 preferably floats in the body of water in which it is placed, and does not require a permanent, rigid attachment to the ocean floor. Mooring lines may be used to maintain rigid structural array 300 in a desired location within a body of water, and in some implementations of the present invention the mooring anchorages used for this purpose may be drilled into the ocean floor and filled with concrete. Such moorings also prevent stress and strain on a conduit (described more fully below) running along the surface or just beneath the surface of an ocean bed for delivering water, electricity, and data from a rigid structural array of the present invention to a desired location.

FIG. 34 is a perspective view of one implementation of a rigid structural array 400, the figure showing various conduits associated therewith. Rigid structural array 400 includes features and structures described with respect to rigid structural array 300, above, including an upper deck 402, a lower deck 404, desalination plant 408, power plant 410, and associated OWECs 414 having spar buoys 412. Unless otherwise stated, the various structural features and components of rigid structural array 400 that have analogous parts described above with respect to rigid structural array 300 function in substantially the same manner as those described with respect to rigid structural array 300, above.

Rigid structural array 400 includes, for example, a shipping container 420 housing an accumulator and throttling valves (not shown) to regulate seawater flow between electrical generation via power plant 410 and water production via desalination plant 408. Water is provided to shipping container 420 from OWECs 414 via conduits 424, which run from OWECs 414 and shipping container 420 and allow flow of water therethrough. The seawater is provided from shipping container 420 to desalination plant 408 and power plant 410 via pipes 426 and 428, respectively. Potable water output from desalination plant 408 is routed along conduit 422, whereas electricity output from power plant 410 is routed along conduit 424. These two conduits preferably combine to form a single conduit 422 that carries all of the product of rigid structural array 400 to a desired location such as shore. That is, conduit 422 carries electrical output, potable water output, and other output such as, for example, computer commands via fiber optic lines. All is bundled into structurally distinct components of conduit 422. Suitable methods of accomplishing this are well known in the art. It is contemplated that conduit 422 may extend to shore or to other desired location by, for example, a hard pipe on the surface, or just beneath the surface, of the ocean floor.

In any of the implementations of the present device described above having power or desalination plants associated therewith, it is contemplated that the power or desalination plants are kept well above the surface of the water by the height of the upper deck upon which they are positioned. Thus, ocean water is prevented from impacting these areas and causing corresponding hazards or malfunctions.

It is further contemplated that commercial use of the rigid structural arrays described herein may include a large number of rigid structural arrays connected to form one super-structure. Such a commercial implementation may, for example, include fifty rigid structural arrays deployed over a two kilometer by five-hundred meter area. This implementation of the present invention will result in considerable space available on the upper deck or decks of the super-structure. Such space may be utilized, for example, to provide housing for those working with the present device or for others.

The detailed description set forth above is provided to aid those skilled in the art in practicing the present invention. The invention described and claimed herein, however, is not to be limited in scope by the specific implementations disclosed because these implementations are intended to be illustrative of several aspects of the invention. Any equivalent implementations are intended to be within the scope of the present invention. Various modifications of the invention that do not depart from the spirit or scope of the present invention, in addition to those shown and described herein, will become apparent to those skilled in the art from the foregoing description. Such modifications are also intended to fall within the scope of the appended claims.

Having thus described the preferred implementation of the invention, what is claimed as new and desired to be protected by Letters Patent includes the following:

1. A device for maintaining a plurality of ocean wave energy converters at a predetermined proximity in a body of water, the device comprising:

at least one deck, said deck having a plurality of openings spaced at a predetermined distance from one another, each of said plurality of openings adapted to receive at least a portion of a ocean wave energy converter therein, wherein is said device is substantially free-floating, and further wherein said plurality of openings render said device substantially resistant to the action of waves.

2. The device according to claim 1 wherein said at least one deck is an upper deck and said plurality of openings therein are first openings adapted to receive at least a first portion of an ocean wave energy converter therein, and further comprising:
- a lower deck, said lower deck having a plurality of second openings spaced apart at a predetermined distance from one another, each of said plurality of second openings adapted to receive at least a second portion of an ocean wave energy converter therein; and
- at least one support member fixedly attached to a lower surface of said upper deck and an upper surface of said lower deck for connecting said upper and lower decks and forming a unitary structure, wherein said plurality of second openings in the lower deck render said device substantially resistant to the action of waves.

3. The device according to claim 2 wherein said lower deck has a porous structure.

4. The device according to claim 2 wherein said lower deck is constructed from a porous material.

5. The device according to claim 2 wherein said plurality of second openings are sized and shaped to receive an ocean wave energy converter therethrough such that said ocean wave energy converter can be removed, through said second opening, from a body of water in which said device is positioned.

6. The device according to claim 2 further comprising a submerged deck positioned substantially below the surface of a body of water in which said device is positioned, and at least one support member fixedly attached to a lower surface of said lower deck and an upper surface of said submerged deck for connecting said lower and submerged decks and forming a unitary structure.

7. The device according to claim 2 wherein said upper deck includes a desalination portion for the desalination of water provided thereto.

8. The device according to claim 7 wherein said desalination portion is adapted to desalinate water by reverse osmosis.

9. The device according to claim 8 wherein waste water from said reverse osmosis is utilized to operate a turbine for the production of electricity.

10. The device according to claim 2 wherein said upper deck includes a power plant portion adapted for a function selected from the group consisting of making electricity, receiving electricity, distributing electricity, and combinations thereof.

11. The device according to claim 10 wherein said power plant portion is further adapted to produce electricity from water received thereby.

12. The device according to claim 1 wherein said device is adapted to produce both electricity and potable water from the action of said plurality of ocean wave energy converters.

13. The device according to claim 1 wherein said device is adapted to be either fixedly or removably attached to at least one other device for maintaining a plurality of ocean wave energy converters at a predetermined proximity in a body of water, such that the combination of said device and said at least one other device is adapted to maintain a greater number of ocean wave energy converters at a predetermined proximity in a body of water.

14. The device according to claim 13 wherein a potable water and electricity output of said device and said at least one other device is combined.

15. A device for maintaining a plurality of ocean wave energy converters at a predetermined proximity in a body of water, the device comprising:
- an upper deck, said upper deck having a plurality of first openings spaced at a predetermined distance from one another, each of said plurality of openings adapted to receive at least a first portion of an ocean wave energy converter therein;
- a lower deck, said lower deck having a plurality of second openings spaced at a predetermined distance from one another, each of said plurality of second openings adapted to receive at least a second portion of an ocean wave energy converter therein and wherein said plurality of second openings render said device substantially resistant to the action of waves; and
- at least one support member fixedly attached to a lower surface of said upper deck and an upper surface of said lower deck for connecting said upper and lower deck, wherein said device is substantially free-floating.

16. The device according to claim 15 wherein said lower deck has a porous structure.

17. The device according to claim 15 wherein said device is adapted to produce both electricity and potable water from the action of said plurality of ocean wave energy converters.

18. The device according to claim 15 wherein the output of said ocean wave energy converters is combined.

19. The device according to claim 17 wherein production of said potable water and electricity is determined by an operator of said device, and said operator can instruct said device to divide its capability between potable water and electricity in any suitable ratio, including production of potable water alone, electricity alone, or any combination thereof.

20. The device according to claim 15 wherein said upper deck includes an output portion adapted to provide an output selected from the group consisting of potable water, electricity, or a combination thereof.

21. The device according to claim 15 wherein said upper deck includes a power plant portion.

22. The device according to claim 21 wherein said power plant portion is maintained at a height above the surface of a body of water in which said device is positioned so as to maintain said power plant portion in a dry condition.

23. The device according to claim 15 wherein said upper deck includes a desalination portion.

24. The device according to claim 23 wherein said desalination plant portion is maintained at a height above the surface of a body of water in which said device is positioned so as to maintain said power plant portion in a dry condition.

25. The device according to claim 15 further comprising electricity-producing portions selected from the group consisting of steam turbines, wind turbines, solar thermal collectors, and photovoltaic cells.

26. The device according to claim 15 wherein said device is adapted to be either fixedly or removably attached to at least one other device for maintaining a plurality of ocean wave energy converters at a predetermined proximity in a body of water, such that the combination of said device and said at least one other device is adapted to maintain a greater number of ocean wave energy converters at a predetermined proximity in a body of water.

27. The device according to claim 26 wherein at least a portion the upper decks of said combined devices are utilized for building housing structures thereon.

* * * * *